US009079142B2

(12) United States Patent
Cicenas et al.

(10) Patent No.: US 9,079,142 B2
(45) Date of Patent: Jul. 14, 2015

(54) HYDRAULIC MIXING DEVICE FOR SPRAYER SYSTEM

(71) Applicant: OMS Investments, Inc., Los Angeles, CA (US)

(72) Inventors: Chris W. Cicenas, Etna, OH (US); Paul Hsu, Lewis Center, OH (US); Paul M. Havlovitz, Dublin, OH (US)

(73) Assignee: OMS INVESTMENTS, INC., Los Angeles, CA (US)

( * ) Notice: Subject to any disclaimer, the term of this patent is extended or adjusted under 35 U.S.C. 154(b) by 292 days.

(21) Appl. No.: 13/794,228

(22) Filed: Mar. 11, 2013

(65) Prior Publication Data

US 2014/0251469 A1 Sep. 11, 2014

(51) Int. Cl.

| | |
|---|---|
| ***G05D 11/00*** | (2006.01) |
| ***B01F 5/04*** | (2006.01) |
| ***B01F 15/04*** | (2006.01) |
| ***B01F 3/08*** | (2006.01) |
| ***F04B 13/00*** | (2006.01) |
| ***F04B 53/10*** | (2006.01) |
| ***F04B 53/14*** | (2006.01) |
| ***F04B 53/16*** | (2006.01) |

(52) U.S. Cl.

CPC ............. *B01F 5/0496* (2013.01); *B01F 3/0865* (2013.01); *B01F 15/047* (2013.01); *F04B 13/00* (2013.01); *F04B 53/10* (2013.01); *F04B 53/14* (2013.01); *F04B 53/16* (2013.01)

(58) Field of Classification Search

USPC .................................... 137/99, 99.5; 417/403

See application file for complete search history.

(56) References Cited

U.S. PATENT DOCUMENTS

| | | | | | |
|---|---|---|---|---|---|
| 3,380,467 | A | | 4/1968 | Diehl | |
| 3,894,690 | A | | 7/1975 | Hill | |
| 4,558,715 | A | | 12/1985 | Walton | |
| 4,809,731 | A | * | 3/1989 | Walton et al. | 137/99 |
| 5,055,008 | A | | 10/1991 | Daniels | |
| 5,137,435 | A | | 8/1992 | Walton | |
| 5,314,120 | A | * | 5/1994 | Nau et al. | 239/310 |
| 5,505,224 | A | * | 4/1996 | Urrutia et al. | 137/99 |
| 5,513,963 | A | | 5/1996 | Walton | |
| 5,560,545 | A | * | 10/1996 | Grogan et al. | 239/304 |
| 5,671,717 | A | | 9/1997 | Rembold | |
| 5,951,265 | A | | 9/1999 | Bryant | |

(Continued)

OTHER PUBLICATIONS

International Search Report with Written Opinion of the International Searching Authority from PCT/US14/22643; Jun. 24, 2014.

*Primary Examiner* — Kevin Murphy
*Assistant Examiner* — R. K. Arundale
(74) *Attorney, Agent, or Firm* — Hunton & Williams LLP

(57) ABSTRACT

A device is designed to be coupled to a fluid supply at a first inlet, to a fluid exhaust path at an outlet, and to an additive source at a second inlet. An inlet stream of working fluid is mixed with the additive in a mixing chamber and an outlet stream of the mixed fluid exhausts from the device. The device uses a hydraulic pump employing a valve mechanism that cycles and ports the flow of fluid through the device and allows for the mixing of the working fluid in the mixing chamber. The valve mechanism is spring actuated by a linkage mechanism employing a push-pull linkages tensioned by a spring. The mixing action allows a specific quantity of additive to mix with the working fluid in the mixing chamber of the device. Thus, the outlet stream provides a mixture of a predetermined concentration of whatever additive is used.

20 Claims, 33 Drawing Sheets

(56) References Cited

U.S. PATENT DOCUMENTS

| | | | |
|---|---|---|---|
| 6,129,526 | A | 10/2000 | Kelly |
| 6,256,802 | B1 | 7/2001 | Stradinger |
| 6,415,956 | B1 | 7/2002 | Havlovitz |
| 6,684,753 | B1 | 2/2004 | Urrutia |
| 6,910,405 | B2 | 6/2005 | Walton |
| 6,997,350 | B2 | 2/2006 | Johnson |
| 7,131,454 | B2 | 11/2006 | Walton |
| 7,156,324 | B2 | 1/2007 | Birrenkott |
| 7,438,537 | B2 | 10/2008 | Walton |
| 7,997,449 | B2 | 8/2011 | Banco et al. |
| 2005/0072800 | A1 | 4/2005 | Smith |
| 2007/0128054 | A1 | 6/2007 | Wrench |
| 2010/0051716 | A1 | 3/2010 | Walton |
| 2010/0212303 | A1 | 8/2010 | Jaulmes |
| 2012/0223161 | A1 | 9/2012 | Goodwin et al. |

* cited by examiner

HYDRAULIC MIXING DEVICE FOR SPRAYER SYSTEM

FIELD OF THE INVENTION

The present invention relates to spraying devices. Specifically, exemplary embodiments employ a hydraulic pump for mixing a liquid additive to a liquid in a predetermined concentration for application to a surface. The mixing is done in a sealed device with minimal to no interaction required from a user.

BACKGROUND

In many applications it is necessary to apply liquid chemicals to surfaces or objects. These applications include, but are not limited to, lawn and garden and agricultural applications, as well as other industrial applications. These liquid chemicals serve a variety of purposes from fertilization to killing pests. In many applications, it is necessary to mix the liquid chemical with a second fluid, typically water, prior to application. The mixing is done in a certain proportional to ensure effectiveness of the chemical.

Some form of device is typically used to ensure proper mixing of the chemical and the water prior to the mixture's application. Many devices require a high degree of interaction from a user during use, as well as requiring manual mixing of the chemical and the water, which can involve exposing the user to the unmixed chemical concentrate.

These and other deficiencies exist. Embodiments of the present invention provide an apparatus that addresses one or more of these deficiencies.

SUMMARY OF THE INVENTION

Exemplary embodiments include a hydraulic pump for adding a predetermined volume of additive fluid to a primary fluid, the pump having: a main body having a first inlet for receiving a primary fluid, a second inlet for receiving an additive fluid, and an outlet for discharging a fluid, wherein the fluid comprises a fluid mixture of the primary fluid and the additive fluid or the primary fluid; a piston sealingly mounted in the main body for reciprocating movement in response to flow of the primary fluid through the main body, the piston dividing the main body into a first and a second chamber; a first valve for selectively transmitting the primary fluid from the inlet into the first and second chambers; a second valve for selectively transmitting the fluid from the first and second chambers to the outlet; an operable interconnection between the drive piston and the first and second valves comprising: a linkage mechanism and a spring attached thereto and responsive to the reciprocating movement of the drive piston for alternating the first and second valves between a first state, wherein the first valve transmits primary fluid from the inlet to the first chamber and the second valve transmits fluid from the second chamber to the outlet, and a second state, wherein said first valve transmits primary fluid from the inlet to the second chamber and the second valve transmits fluid from the first chamber to said outlet; an extractor piston attached to the drive piston and sealingly mounted in a third chamber formed therein the main body; a source of additive fluid communicably connected to the third chamber; the additive piston slidably mounted in the third chamber such that the additive piston reciprocates in response to movement of the drive piston for pumping additive fluid from the source to the second chamber.

These and aspects of the invention will become apparent from the following detailed description, taken in conjunction with the accompanying drawings, illustrating by way of example the principles of the various exemplary embodiments of the invention.

DETAILED DESCRIPTION OF THE INVENTION

Figure 1:
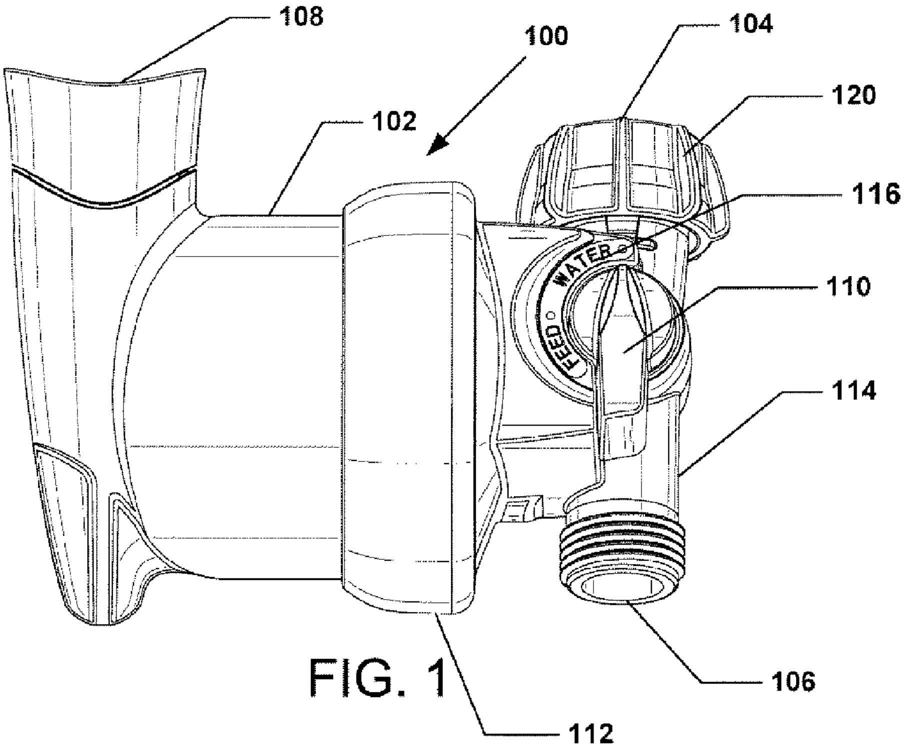
FIG. 1 depicts a front elevational view of the device according to exemplary embodiments with a selector switch in a first position.
Figure 2:
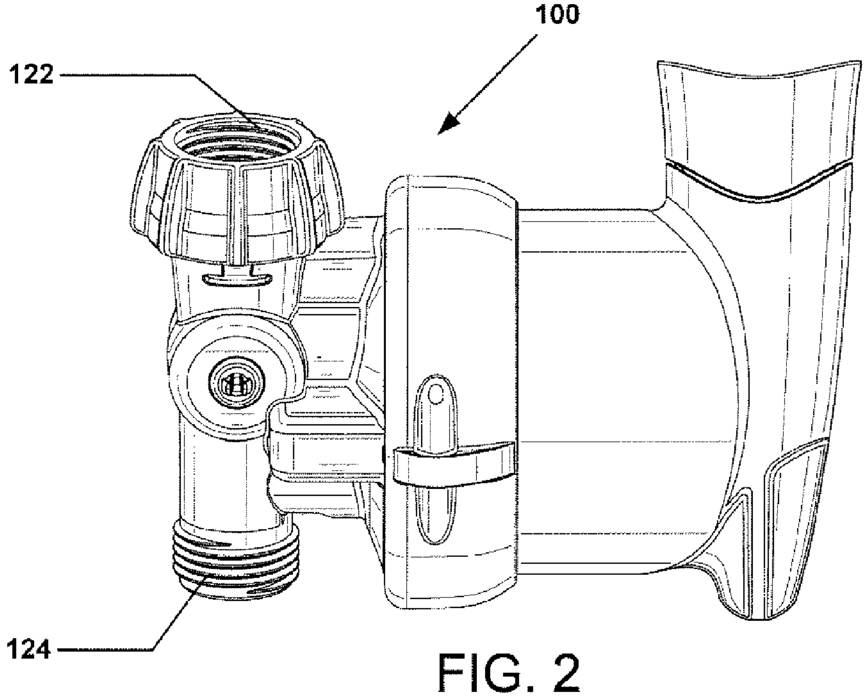
FIG. 2 depicts an rear elevational view of the device according to exemplary embodiments.
Figure 3:
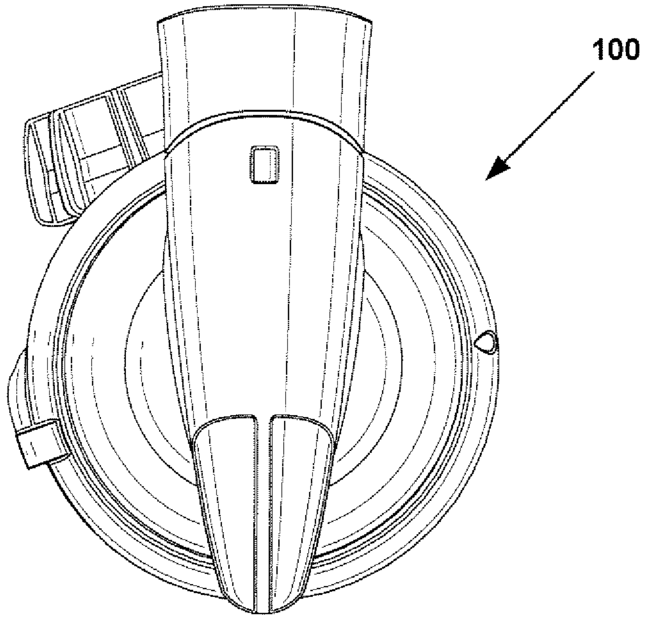
FIG. 3 depicts a side elevational view of the device according to exemplary embodiments.
Figure 4:
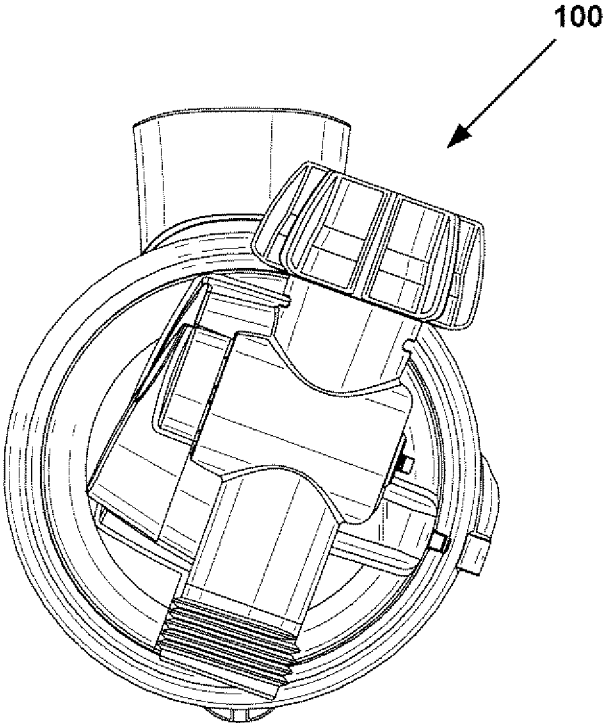
FIG. 4 depicts an opposite side elevations view of the device according to exemplary embodiments.
Figure 5:
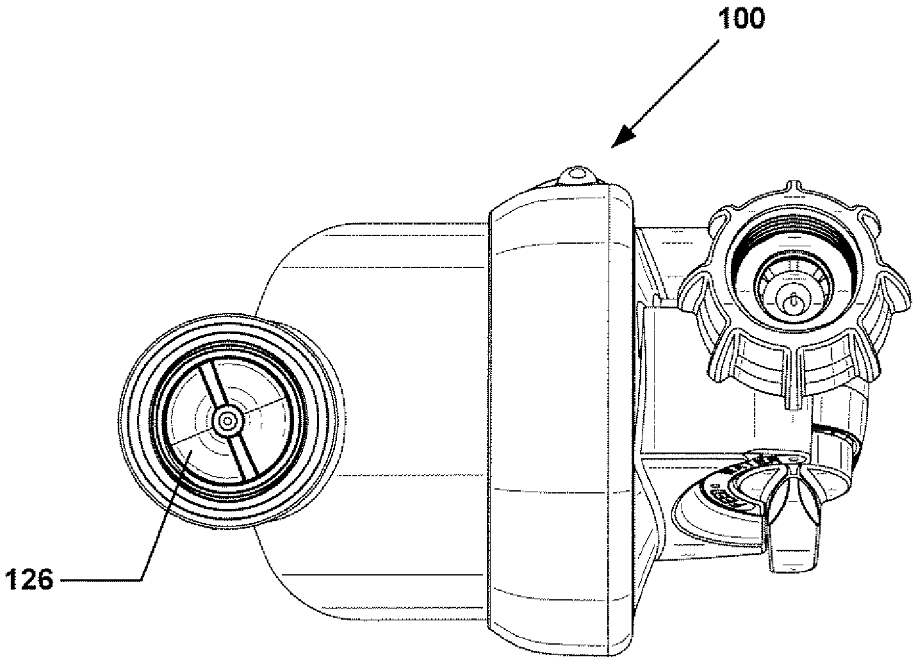
FIG. 5 depicts a top view of the device according to exemplary embodiments.
Figure 6:
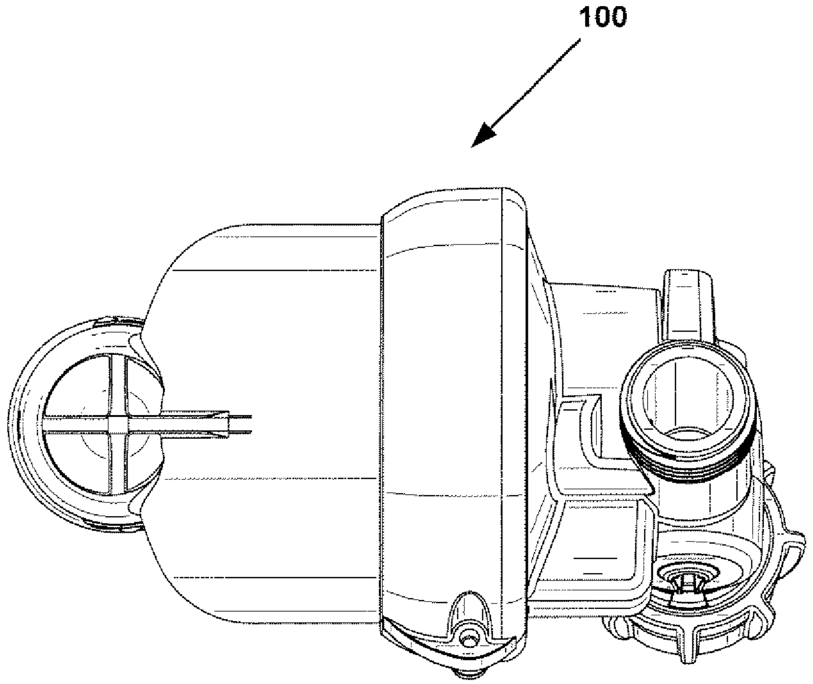
FIG. 6 depicts a bottom view of the device according to exemplary embodiments.

It will be readily understood by those persons skilled in the art that the embodiments of the inventions described herein are capable of broad utility and application. Accordingly, while the invention is described herein in detail in relation to the exemplary embodiments, it is to be understood that this disclosure is illustrative and exemplary of embodiments and is made to provide an enabling disclosure of the exemplary embodiments. The disclosure is not intended to be construed to limit the embodiments of the invention or otherwise to exclude any other such embodiments, adaptations, variations, modifications and equivalent arrangements.

The following descriptions are provided of different configurations and features according to exemplary embodiments of the invention. These configurations and features may relate to providing a spraying device for mixing one or more additives to water (or another working fluid) for application to a surface or an object. While certain nomenclature and types of applications or hardware are described, other names and applications or hardware usage is possible and the nomenclature provided is done so by way of non-limiting examples only. Further, while particular embodiments are described, these particular embodiments are meant to be exemplary and non-limiting and it further should be appreciated that the features and functions of each embodiment may be combined in any combination as is within the capability of one of ordinary skill in the art.

The figures depict various functionality and features associated with exemplary embodiments. While a single illustrative block, sub-system, device, or component is shown, these illustrative blocks, sub-systems, devices, or components may be multiplied for various applications or different application environments. In addition, the blocks, sub-systems, devices, or components may be further combined into a consolidated unit or divided into sub-units. Further, while a particular structure or type of block, sub-system, device, or component is shown, this structure is meant to be exemplary and non-limiting, as other structure may be able to be substituted to perform the functions described.

Exemplary embodiments include a device that is designed to be coupled to a fluid supply at a first inlet, coupled to a fluid exhaust path at an outlet, and coupled to an additive source at a second inlet. Water may be used as the primary working fluid. According to exemplary embodiments, the device can operate in a wide range of input conditions such as low (30 psi) and high (70 psi) water pressures and low (0.1 GPM) and high (7 GPM) flow rates. These conditions allow the device to be used in a variety of ways including slow drip irrigation and wide spread sprinkler application. Additionally, the device can be left running without supervision.

However, it should be appreciated that while exemplary embodiments are described as using water as the working fluid, other fluids may be used. For example, in some embodiments, the working fluid may be a fluid mixture source coupled to the first inlet and further mixed with an additional additive through the second inlet. The device may further be used in series with other devices to facilitate the addition of multiple additives in series to the working fluid.

Accordingly, an inlet stream of working fluid is mixed with the additive in a mixing chamber located in a main body of the device and an outlet stream of the mixed fluid exhausts from the device. The device contains a hydraulic pump employing a valve mechanism, mounted on a master piston, that cycles and ports the flow of fluid through the device and allows for the mixing of the working fluid in the mixing chamber. The valve mechanism is spring actuated by a linkage mechanism employing a push-pull linkages tensioned by a spring. The mixing action allows a specific quantity of additive to mix with the working fluid in the mixing chamber of the device. Thus, the outlet stream provides a mixture of a predetermined concentration of whatever additive is used. It should be appreciated that any liquid additive can be used in the device. For example, the liquid additive may be plant food and when used in this manner, the device can be used by a consumer to feed their plants.

FIGS. 1 through 18 depict a device 100 according to exemplary embodiments. It should be appreciated that although each element labeled and described on FIG. 1 may not be labeled in the subsequent Figures, each element is present and the description pertains as if it was labeled. The device 100 has a main body 102 containing a piston cylinder, a first inlet 104 for coupling to an external source for a working fluid, a fluid exhaust 106 for exhausting either the working fluid or a mixture of an additive and the working fluid, a second inlet 108 for coupling to an external source of an additive, and a selector switch 110 for selecting between two positions for porting the working fluid from the first inlet. According to exemplary embodiments, the device 100 is constructed of plastic. In other embodiments, different materials may be used. For example, metal or rubber may be used. In some embodiments, a combination of materials, such as different plastics or a combination of plastic, rubber, and metal may be used. The materials may be selected based on the working fluid(s) and additive(s) used in the device such that the device is able to operate with such liquids. For example, if a corrosive or toxic working fluid or additive is used, an appropriate material or materials would be selected for construction of the device 100 to ensure the device is capable of sustained operations in this environment. For example, certain additives may be for weed killing or insecticides which may have corrosive or toxic properties. Likewise, the working fluid may be similarly toxic or corrosive. The device 100 would be constructed of materials appropriate for this operational environment.

Figure 7:
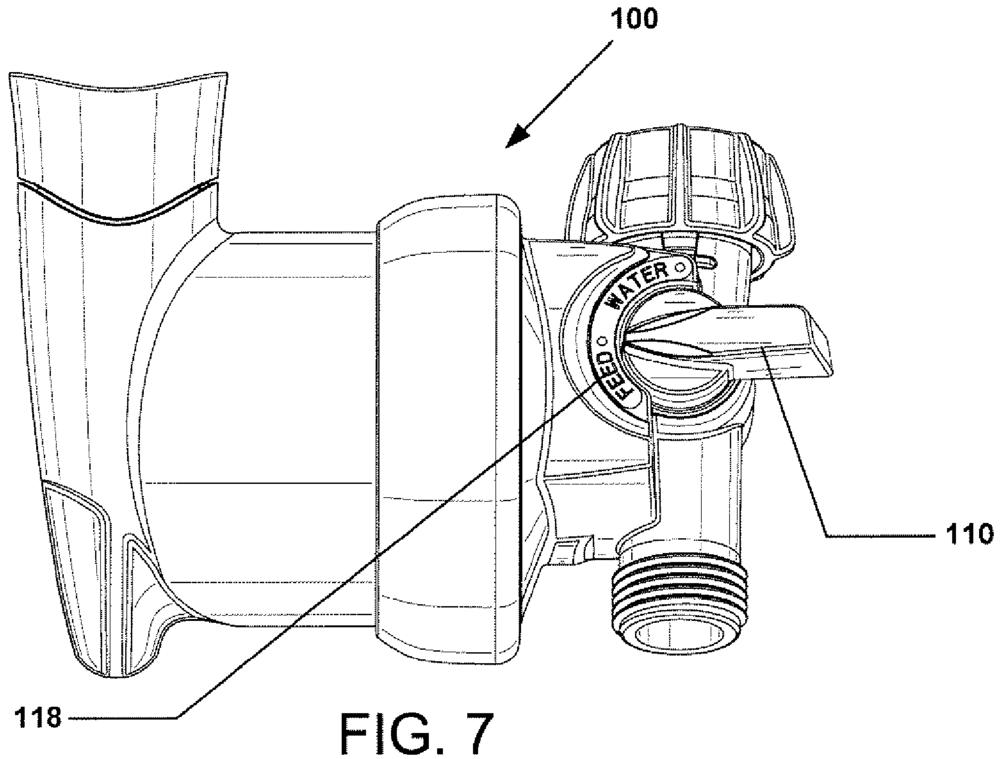
FIG. 7 depicts a front elevational view of the device according to exemplary embodiments with the selector switch rotated to a second position.
Figure 8:
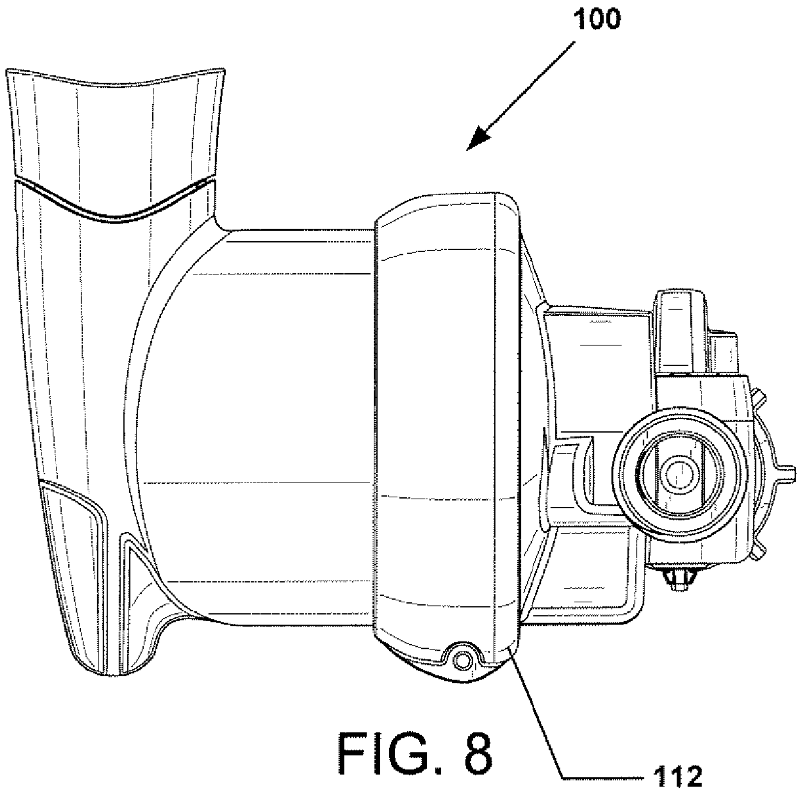
FIG. 8 depicts a front elevational view of the device according to exemplary embodiments with a right side portion rotated to a different position than FIG. 1.
Figure 9:
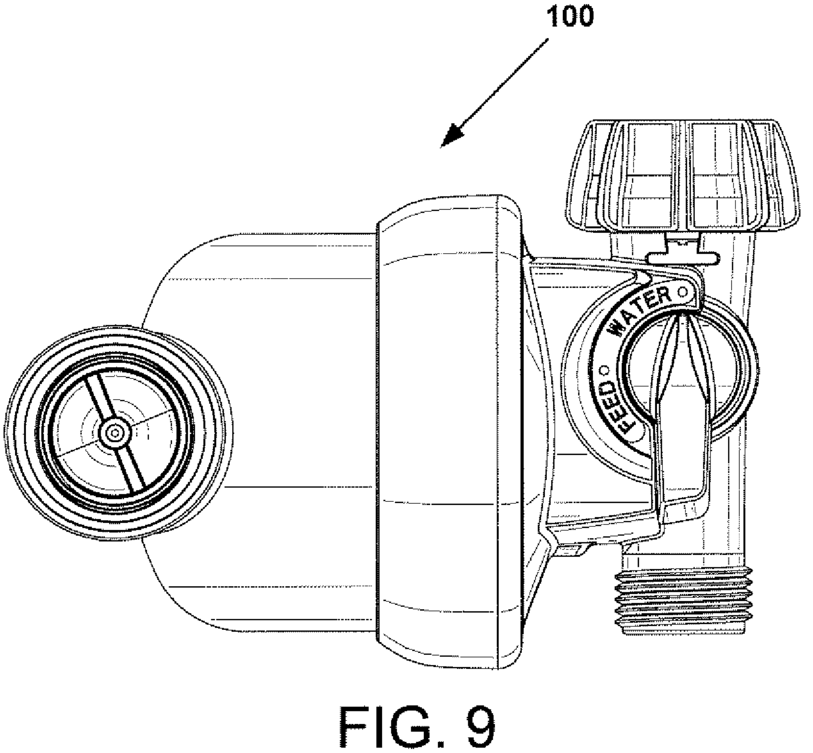
FIG. 9 depicts a top view of the device according to exemplary embodiments with the right side portion rotated to a different position than FIG. 5.
Figure 10:
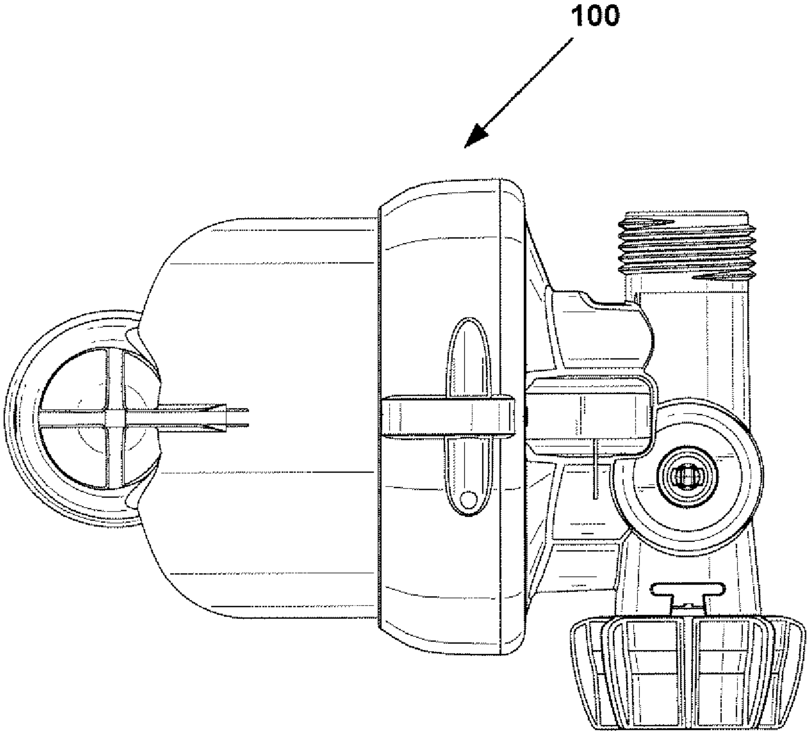
FIG. 10 depicts a bottom view of the device according to exemplary embodiments with the right side portion rotated to a different position than FIG. 6.
Figure 11:
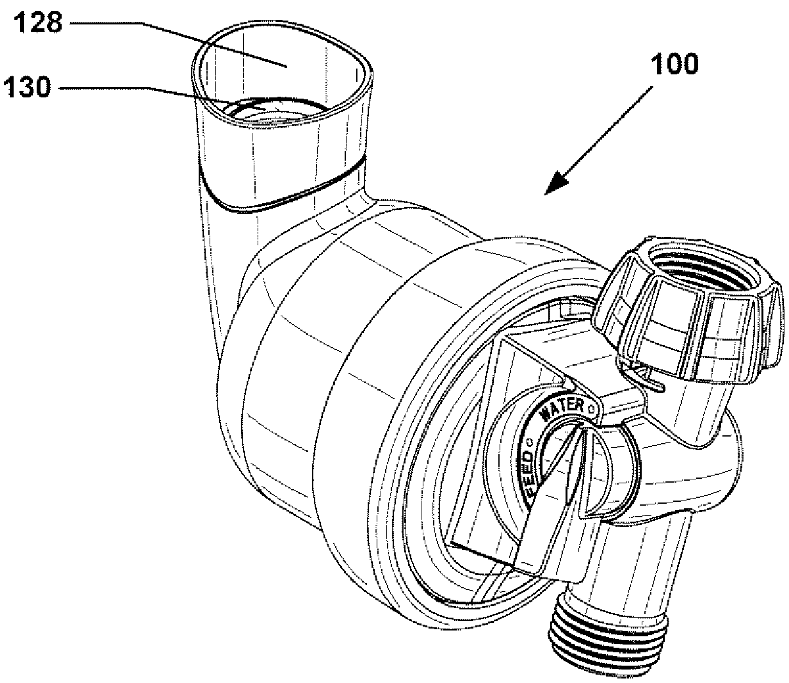
FIG. 11 depicts a perspective view of the device according to exemplary embodiments.
Figure 12:
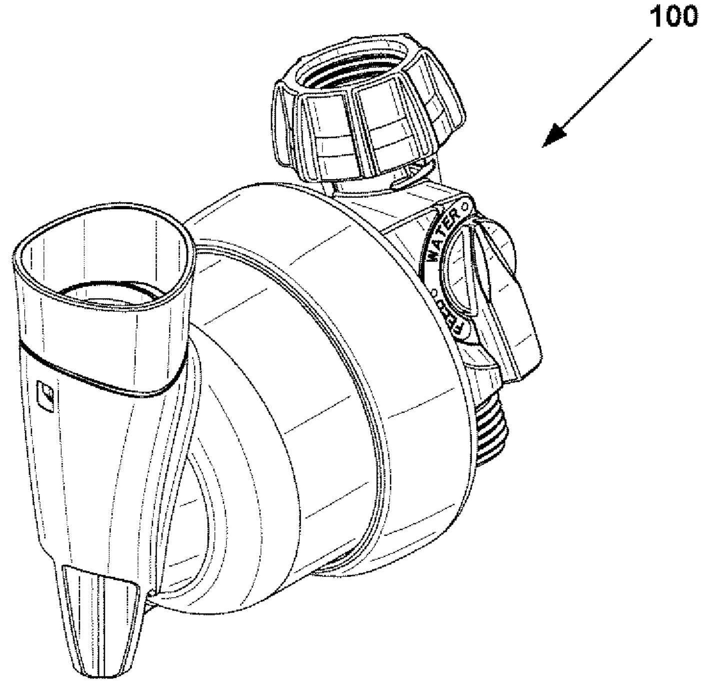
FIG. 12 depicts a second perspective view of the device according to exemplary embodiments.
Figure 13:
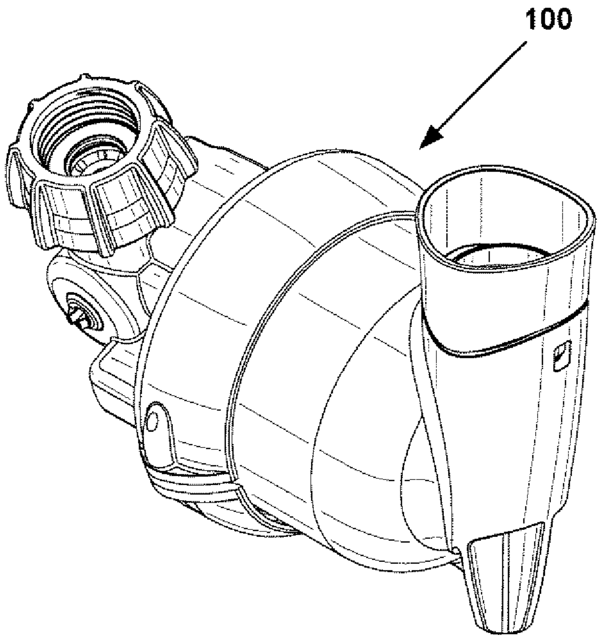
FIG. 13 depicts a third perspective view of the device according to exemplary embodiments.
Figure 14:
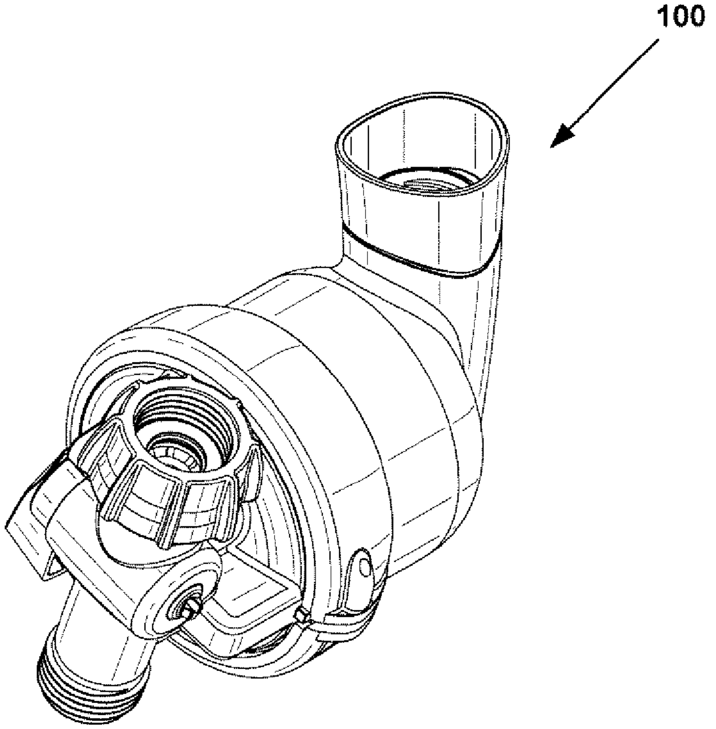
FIG. 14 depicts a fourth perspective view of the device according to exemplary embodiments.
Figure 15:
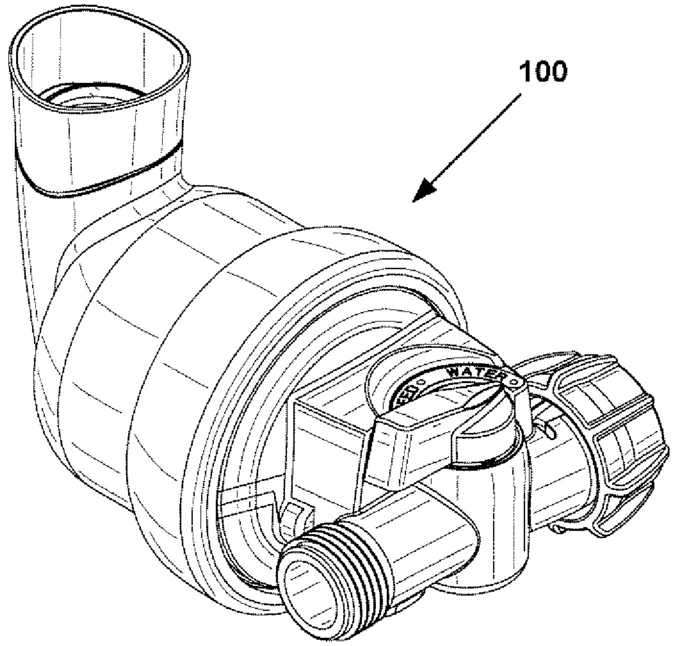
FIG. 15 depicts a perspective view of the device according to exemplary embodiments with the right side portion rotated to a different position than FIG. 11.
Figure 16:
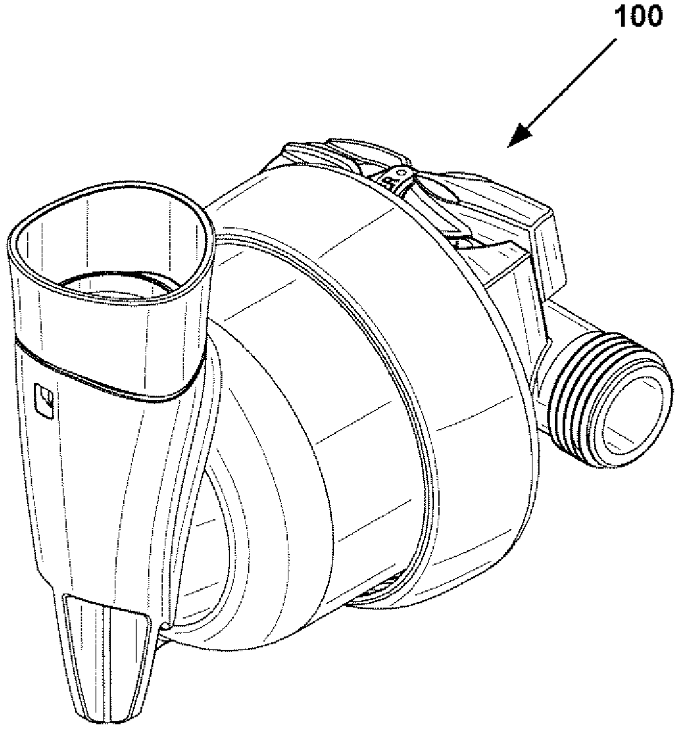
FIG. 16 depicts a second perspective view of the device according to exemplary embodiments with the right side portion rotated to a different position than FIG. 12.
Figure 17:
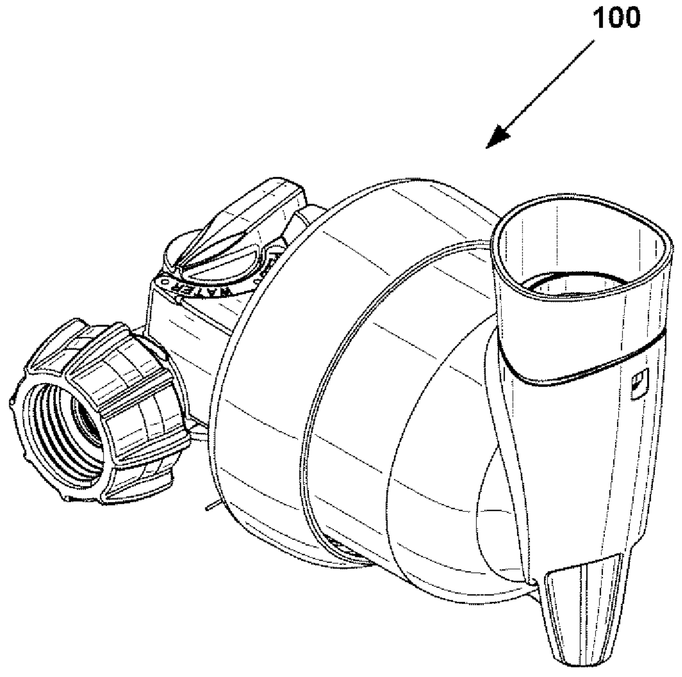
FIG. 17 depicts a third perspective view of the device according to exemplary embodiments with the right side portion rotated to a different position than FIG. 13.
Figure 18:
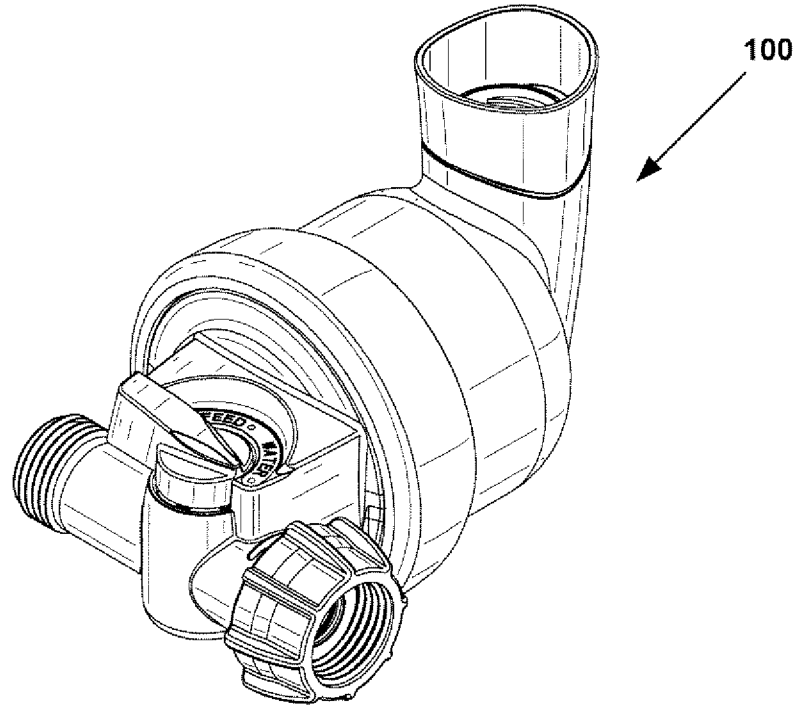
FIG. 18 depicts a fourth perspective view of the device according to exemplary embodiments with the right side portion rotated to a different position than FIG. 14.

According to exemplary embodiments, the selector switch 110 is rotatably mounted to move between the first and second positions. FIG. 1 depicts the selector switch 110 in a first position labeled as "Water" 116 and FIG. 7 depicts the selector switch 110 in a second position labeled as "Feed" 118. Movement of the selector switch 110 changes the position of a selector valve that is mounted to the selector switch. In some embodiments, the selector switch 110 may not be present or it may be set to a fixed position. The device 100 may lack the selector switch as described above or the selector switch may be fixed in the "Feed" position. In other embodiments, the device 100 may have a locking mechanism or other safety feature to fix the selector switch 110 in a particular position, such that changing the position requires additional steps beyond merely rotating the selector switch from one position to the next.

The selector valve 220 is described below. The "Water" position allows the working fluid, which is water according to exemplary embodiments, to flow directly from the first inlet 104 to the second inlet 108. The "Feed" position allows the working fluid to flow from the first inlet 104 into the main body 102. In some embodiments, the selector valve may be fixed in the "Feed" position. The "Water" and "Feed" labels are meant to be exemplary and non-limiting, as the switch positions could be labeled with other terms.

The main body 102 has a portion 112 connected thereto to which the first inlet 104, the fluid exhaust 106, and the selection switch 110 are mounted. A piping section 114 connects the first inlet 104 to the fluid exhaust 106 with the selector switch 110 fluidly located inbetween. The portion 112 may be rotatable with respect to the main body 102 such that the angular position of the first inlet 104 and the fluid exhaust 106 may be altered with respect to the main body 102 and the second inlet 108. The portion 112 may be rotatable through an arc of up to 70 degrees. The rotation of the portion 112 may be limited by a stop (not shown) located on the main body portion 102 where the portion 112 mates thereto. The stop may be a projection on the main body 102 that fits into a cut-out portion on the portion 112. In some embodiments, the arc of rotation may be up to 360 degrees. For example, FIGS. 8, 9, 10, 15, 16, 17, and 18 depict the portion 112 in a rotated state with respect to that shown in FIG. 1.

The first inlet 104 has a coupling 120 for mating with an external working fluid supply. The coupling 120 has internal threads 122 such that it is a female coupling for receiving and mating with a corresponding male coupling. The coupling 120 may therefore be rotatably mounted to facilitate mating with a male coupling. For example, a hose may be attached to the coupling 120 to provide a source for the working fluid.

The fluid exhaust 106 has a set of threads 124 for mating with a corresponding coupling on an apparatus (not shown). The threads 124 are male threads for mating with a female coupling on the apparatus. The apparatus may be a structure for conveyance of the fluid exhaust from the device to a desired application point. For example, the apparatus may be a hose or a spraying device.

It should be appreciated that although threaded couplings are depicted on the device for the first inlet 104 and the fluid exhaust 106, other couplings may be used. For example, snap fit couplings for may be used.

Figure 26:
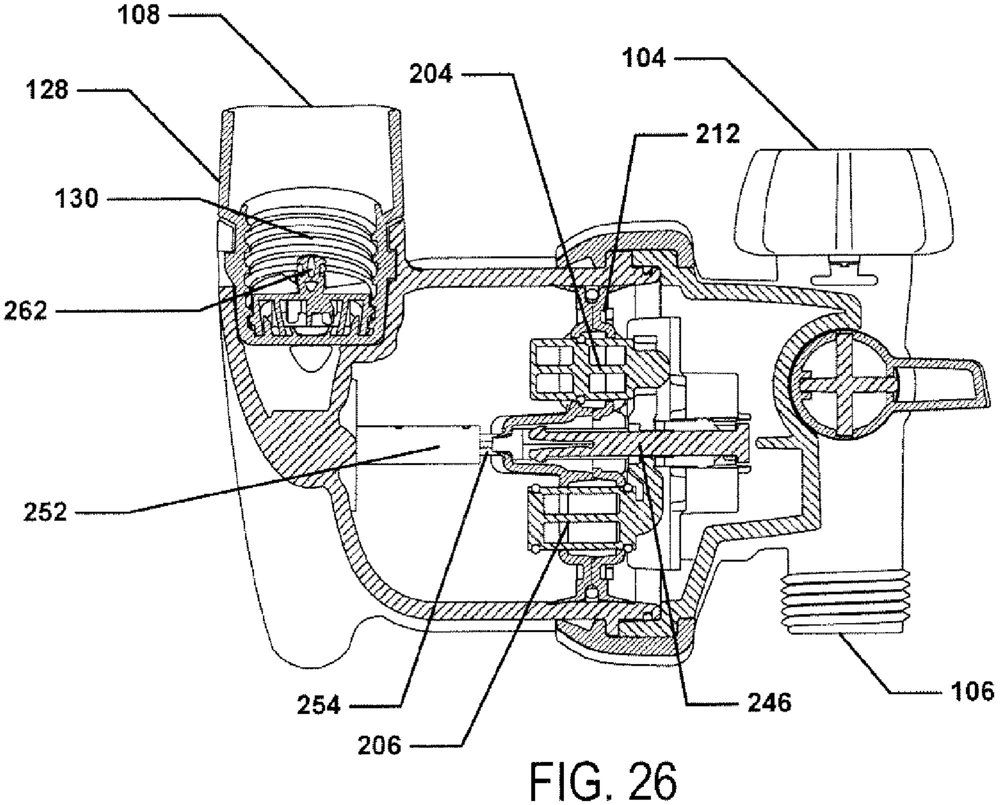
FIG. 26 depicts a cross sectional view taken along line 26-26 of FIG. 22.
Figure 27:
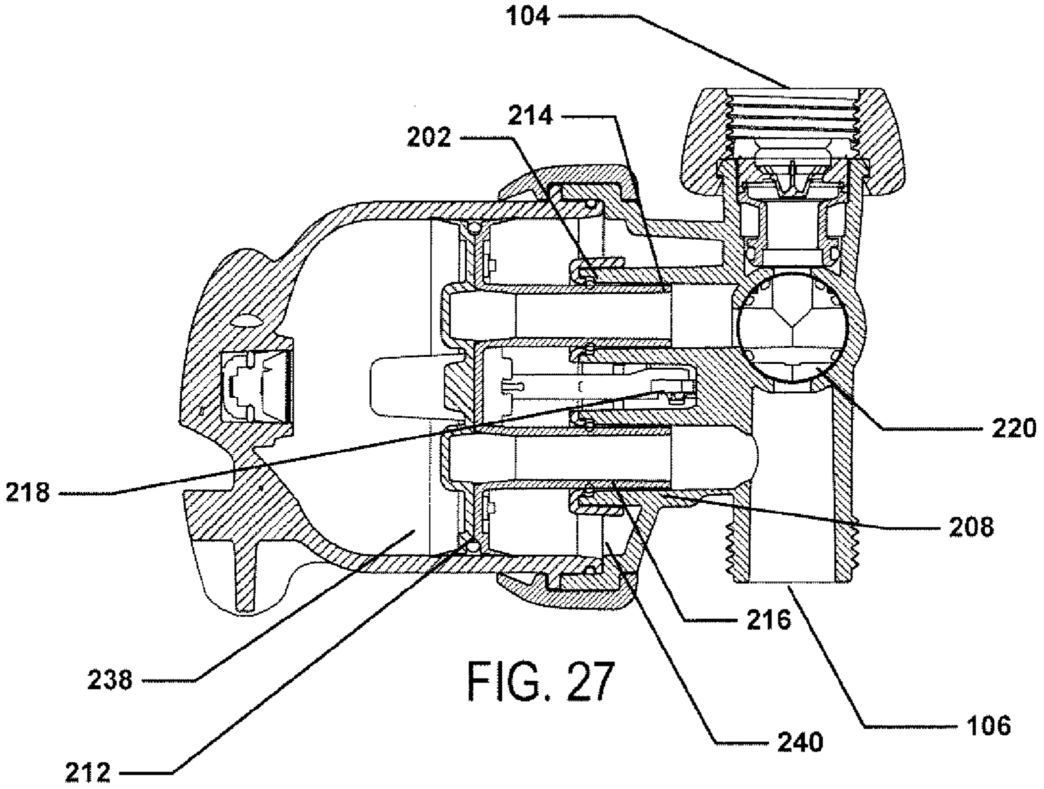
FIG. 27 depicts the cross sectional view taken along line 21-21 of FIG. 19 with the internal structure shown in a different position.
Figure 28:
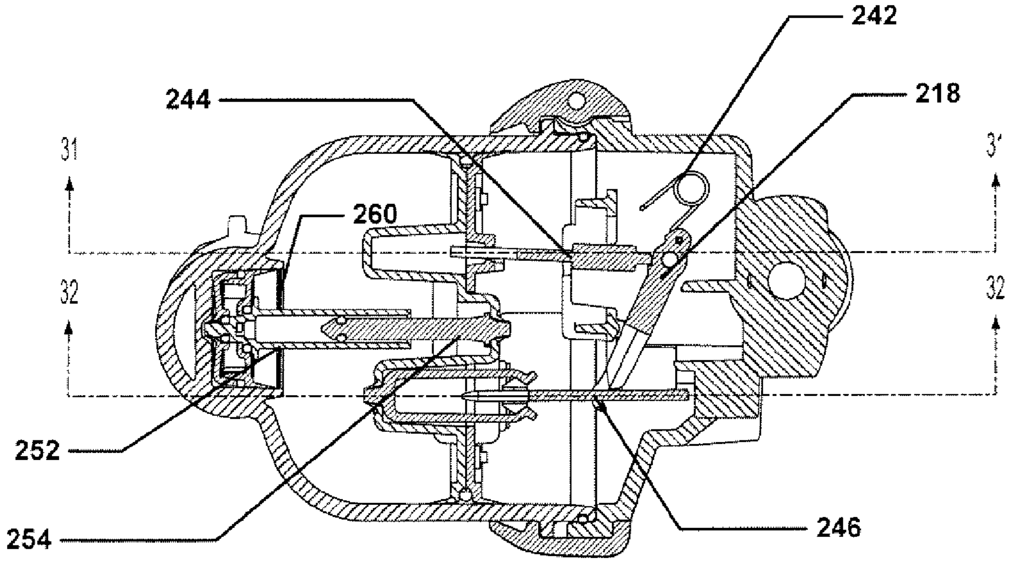
FIG. 28 depicts the cross sectional view taken along line 22-22 of FIG. 20 with the internal structure shown in a different position.
Figure 29:
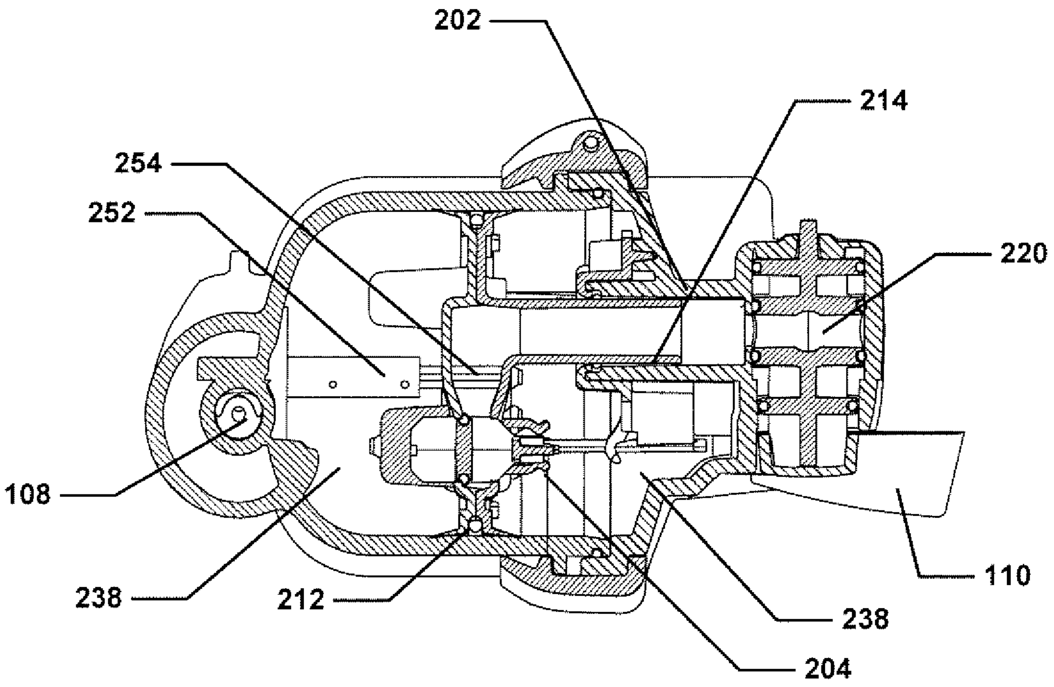
FIG. 29 depicts the cross sectional view taken along line 23-23 of FIG. 20 with the internal structure shown in a different position.
Figure 30:
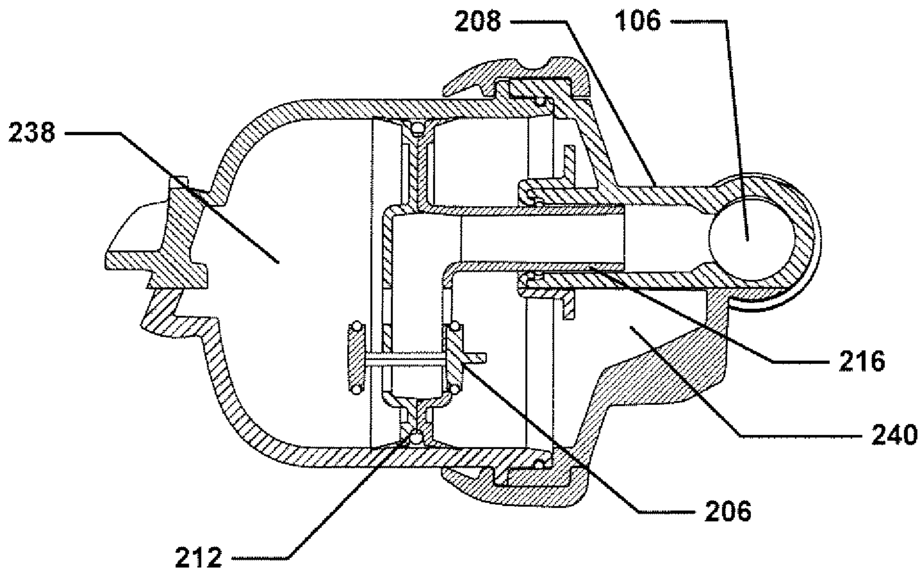
FIG. 30 depicts the cross sectional view taken along line 24-24 of FIG. 20 with the internal structure shown in a different position.
Figure 31:
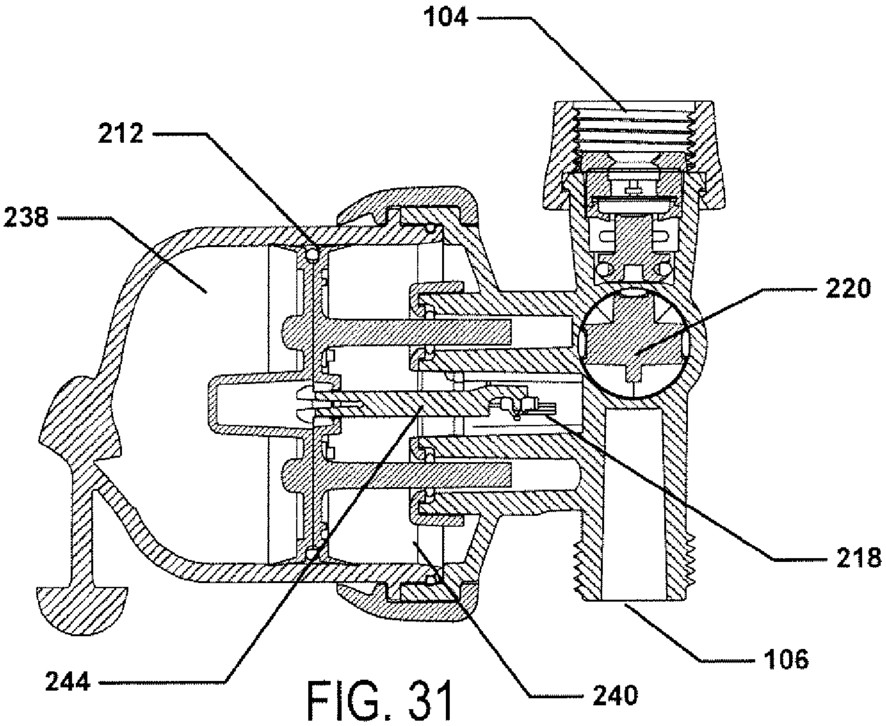
FIG. 31 depicts a cross sectional view taken along line 31-31 of FIG. 28.
Figure 32:
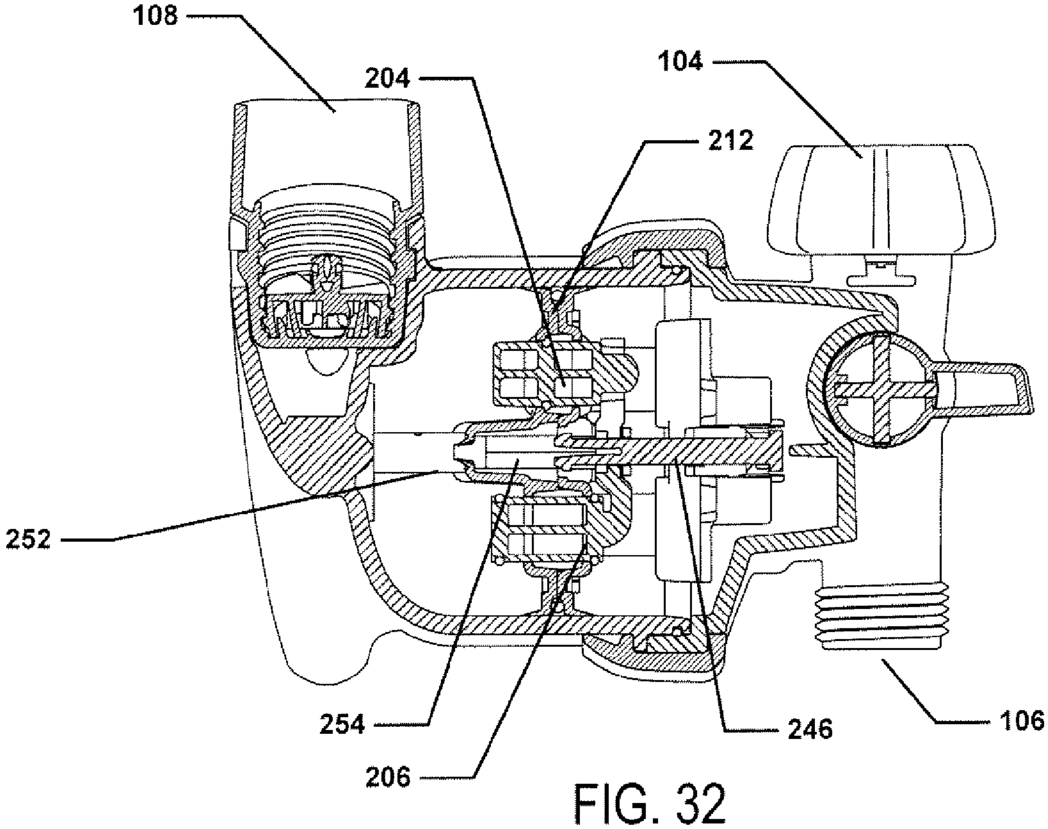
FIG. 32 depicts a cross sectional view taken along line 32-32 of FIG. 28.
Figure 33:
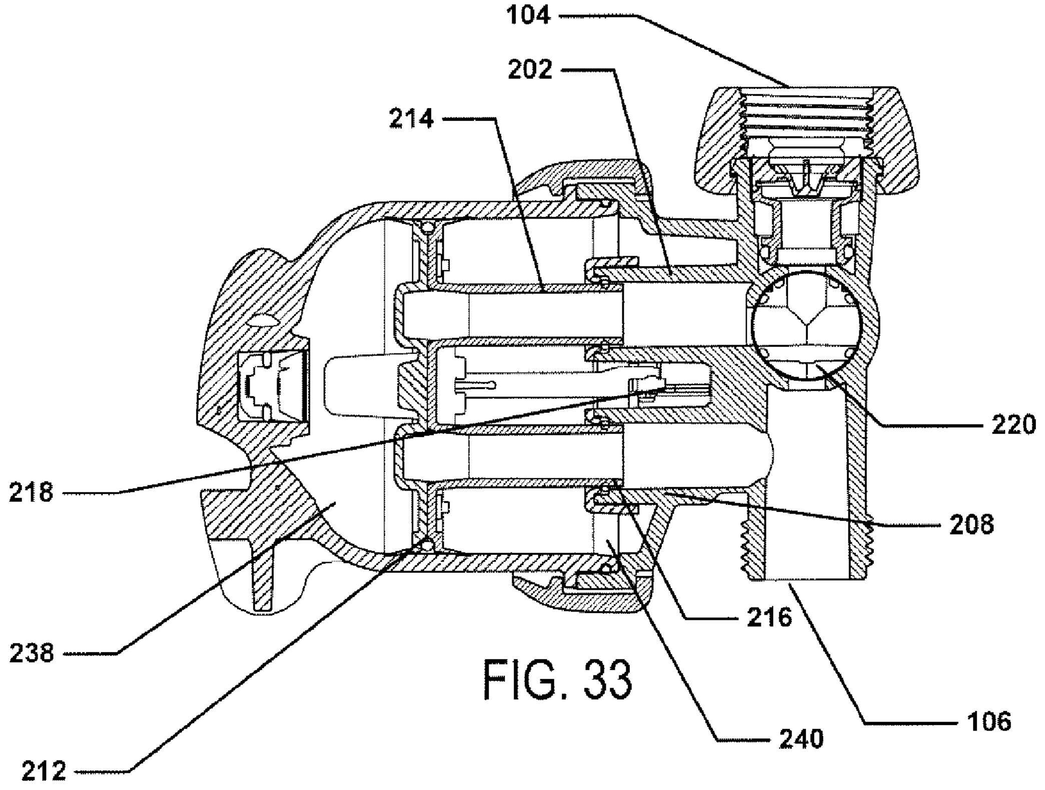
FIG. 33 depicts the cross sectional view taken along line 21-21 of FIG. 19 with the internal structure shown in a different position.

The second inlet 108 has a threaded coupling 126 for receiving an additive source. The second inlet coupling 126 may be configured to receive a container or cartridge (not shown) containing the additive. The container may be configured to mate specifically with the device. For example, the cartridge may be such as described in U.S. Pat. No. 7,156, 324, the contents of which are incorporated by reference herein. In some embodiments, the coupling 126 may be configured to receive a variety of different containers. The coupling 126 has a flange area 128 for supporting the container neck and a threaded area 130 for coupling with the container fitting. The coupling 126 is configured such that when the container is inserted and threaded, fluid flow from the container is enabled by use of a nipple 262 (see FIG. 26). The nipple 262 is designed to mate with a receiver on the container which opens flow from the container. That is, the container is self-sealing upon removal from the coupling 126. It should be appreciated that other coupling structures may be used on the device for the second inlet 108. For example, a snap-fit connection may be used.

Figure 19:
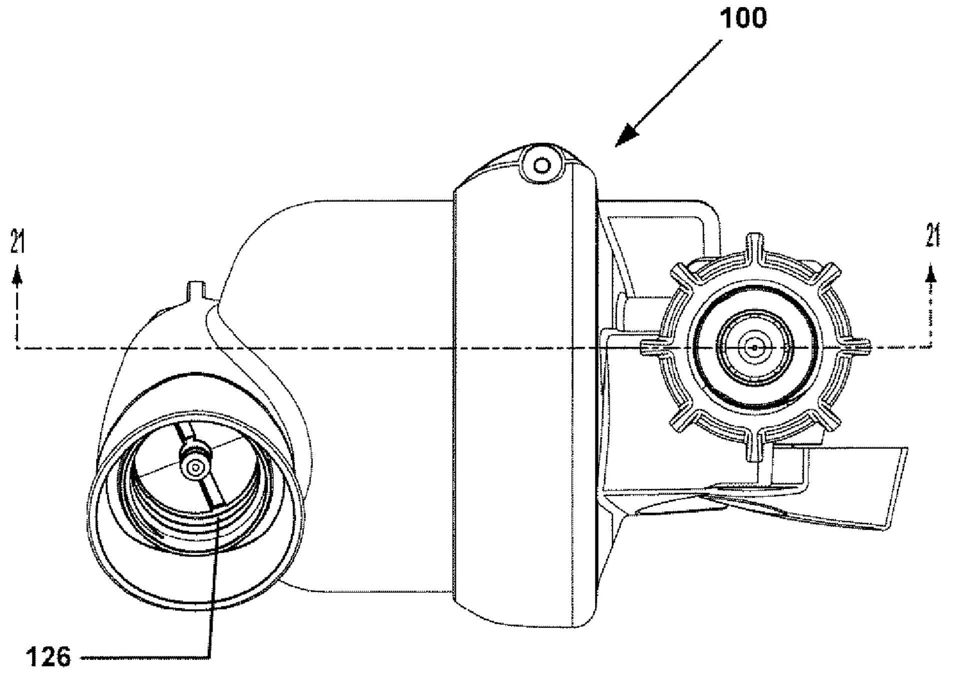
FIG. 19 depicts top view of the device according to exemplary embodiments.
Figure 20:
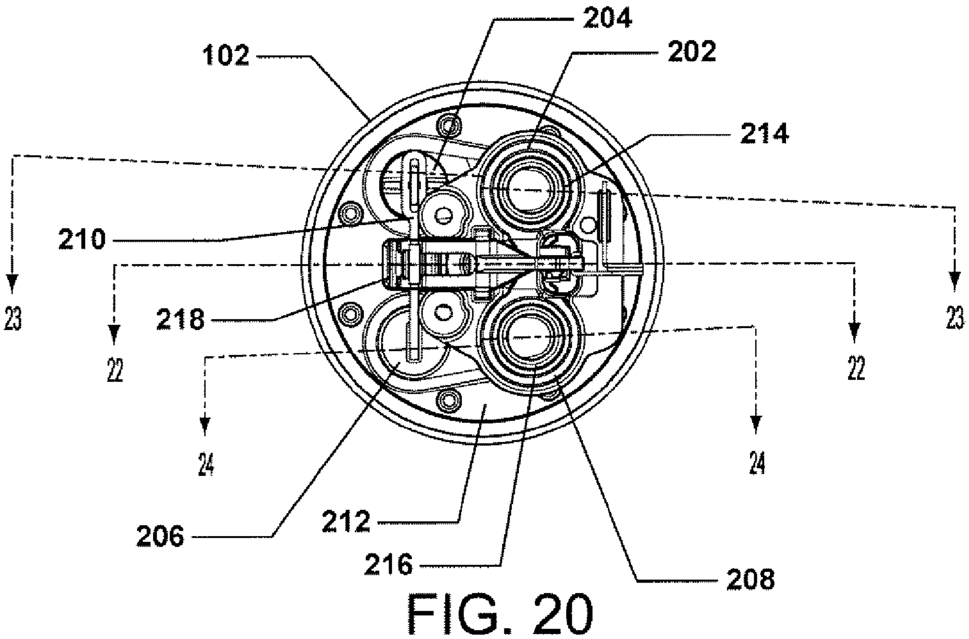
FIG. 20 depicts a side partially schematic view of the device with the portion removed showing the internal structure according to exemplary embodiments.

FIGS. 19 through 63 depict the internal structure of the device 100 in various positions during the operation of the device. The Figures depict a series of cross sectional views of the device 100. Thus as can be seen, FIGS. 21-26 provide a set of cross sectional views of the device 100. The subsequent Figures provide additional cross sectional views from the same perspectives of sequential snapshots of the device 100 in different stages of operation following the positions depicted in FIGS. 21-26. FIGS. 27-32 provide the next snapshot; FIGS. 33-38 provide the following snapshot; FIGS. 39-44 provide the following snapshot; FIGS. 45-50 provide the following snapshot; FIGS. 51-56 provide the following snapshot; and FIGS. 57-62 provide the following snapshot. It should be appreciated that these subsequent Figures are based upon the same cross sectional views identified in FIGS. 19 and 20. Therefore, FIGS. 19 and 20 are not repeated. For example, FIGS. 27, 33, 39, 45, 51, and 57 are the same cross sectional view as FIG. 21. With respect to the cross sections identified in FIG. 20: FIGS. 28, 34, 40, 46, 52, and 58 correspond to the cross section of FIG. 22; FIGS. 29, 35, 41, 47, 53, and 59 correspond to the cross section of FIG. 23; FIGS. 30, 36, 42, 48, 54, and 60 correspond to the cross section of FIG. 24; FIGS. 31, 37, 43, 49, 55, and 61 correspond to FIG. 25, and FIGS. 32, 38, 44, 50, 56, and 62 correspond to FIG. 26.

As shown in FIG. 20, for example, the device 100 has an intake conduit 202 that is fluidly connected to an intake valve 204. An exhaust valve 206 is fluidly connected to an exhaust conduit 208. The intake conduit 202 is fluidly connected to the first inlet 104 and the exhaust conduit is fluidly connected to the fluid exhaust 106. The intake valve 204 and the exhaust valve 206 are connected via a valve bridge 210. The valve bridge 210 connects the valves 204 and 206 such that both valves change position concurrently. The valve bridge 210 further has a detent that is overcome when the valves change position. The intake and exhaust valves are configured such that they "snap" from one position to the next in a relatively fast transition and do not stop at an intermediate position.

The intake valve 204 and the exhaust valve 206 are positioned such that they are in opposition with respect to their operational positions so that the two valves are never in a common position. The intake valve 204 and the exhaust valve 206 are configured to have two positions. One position is the intake valve 204 being open to the water side 240 and the exhaust valve 206 being open to the mixing chamber 238. The second position being the intake valve 204 being open to the mixing chamber 238 and the exhaust valve being open to the water side 240. The intake valve 204 has a set of O-rings or gaskets 205 that provide a seal for the valve in each of its positions. The exhaust valve 206 has a set of o-rings or gaskets 207*a* and *b* that provide a seal for the valve in each of its two positions.

The valve structure, such as the intake valve 204, the exhaust valve 206, and the valve bridge 210 are mounted on a master piston 212. The master piston 212 is sealingly movably mounted in the main body 102. Also mounted to the master piston 212 are tubes 214 and 216 which are concentric with the intake and exhaust conduits. The intake conduit 202 and the exhaust conduit 208 are mounted to the portion 112 connected to the piping section 114 and hence do not move with the master piston 212. The tubes 212 and 214 ensure fluid coupling between the intake and exhaust conduits as the master piston reciprocates. Mounted to the master piston 212 is a toggle linkage 218. The operation of the toggle linkage is described below.

Figure 21:
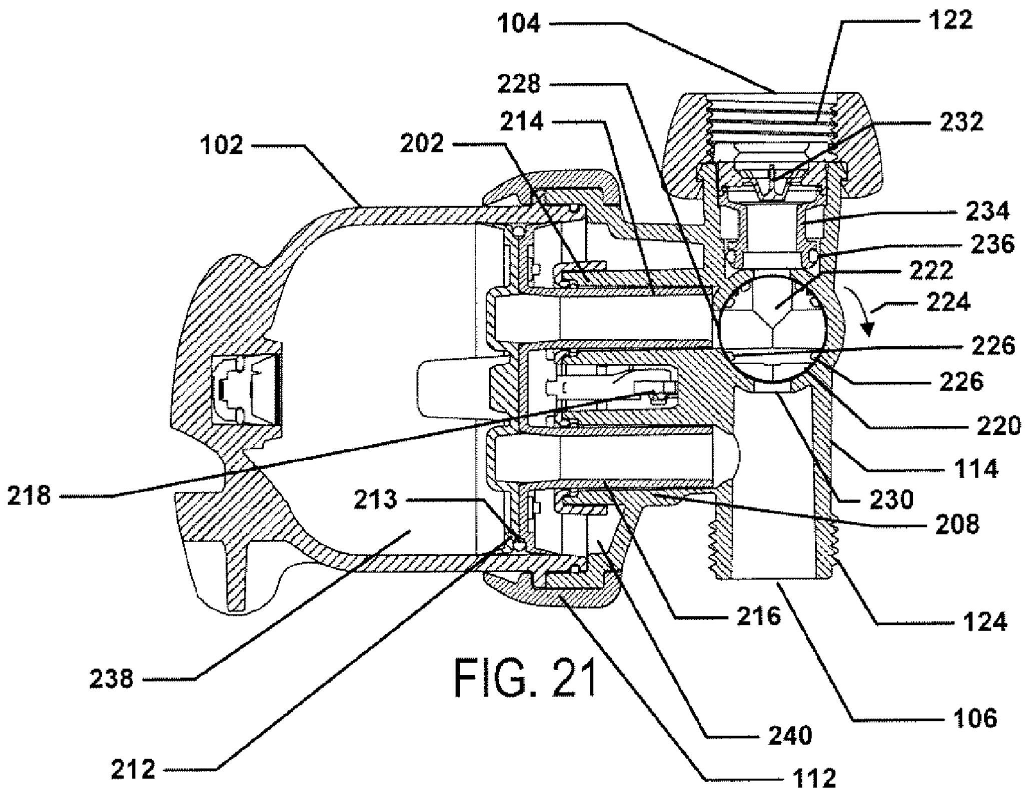
FIG. 21 depicts a cross sectional view taken along line 21-21 of FIG. 19.

FIG. 21 depicts a selector valve 220 according to exemplary embodiments. In FIG. 21 (and in the subsequent Figures), the selector valve 220 is shown in the "Feed" position. In the "Feed" position, the working fluid is ported from the first inlet 106 to the interior the main body 102. The selector valve 220 has a selector valve conduit 222 internally. The selector valve conduit 222, as depicted in FIG. 21, for example, has a "T" shape. When in the position shown in FIG. 21, the working fluid enters the device through the first inlet 104 and is routed into intake conduit 202 through the opening 228. When the selector switch 110 is rotated in the direction shown by arrow 224, the selector valve conduit is rotated 90 degrees. In this position, corresponding to the "Water" position, the working fluid enters the first inlet and routed through the opening 230 to the piping section 114 directly to the fluid exhaust 106. The selector valve 220 is sealingly mounted in the piping section 114 using one or more gaskets or O-rings. These gaskets or o-rings may be silicon, rubber, or another appropriate material based on the fluid types used in the device 100. Hydrophobic or water resistant lubricant may be applied to these gaskets or o-rings to facilitate the rotational movement of the selector valve 220. The selector switch 110 may be rotated opposite to the arrow 224 to return the selector valve 220 to the "Feed" position depicted from the "Water" position.

As described above, the selector valve 220, in some embodiments, may be fixed in the "Feed" position such that all incoming working fluid is ported from the first inlet 106 to the interior the main body 102 as described above.

Mounted within the first inlet 104 is an anti-siphon valve 232. The anti-siphon valve 232 may serve to prevent backflow from the device into the first inlet during device operation; that is, reverse flow from what is described herein. The anti-siphon valve 232 may be any type of appropriate valve to prevent backflow. The first inlet 104 may have a throat section 234 that is mounted past the anti-siphon valve 232 to control the inlet flow. The throat section 234 may be sealingly mounted in the piping section 114 by one or more o-rings or gaskets 236. Additionally, a filter may be included in the first inlet 104. The filter (not shown) may be an optional structure. The filter may serve to stop particulate in the working fluid from entering the device 100.

In FIG. 21, the mating of the portion 112 to the main body 102 can be seen. An interlocking and overlapping structure is used. The portion 112 and the main body 102 may be joined such that rotational movement of the portion 112 with respect to the main body 102 is allowed as described above. One or more gaskets or o-rings may be used to provide a seal between the portions preventing fluid leakage.

Figure 22:
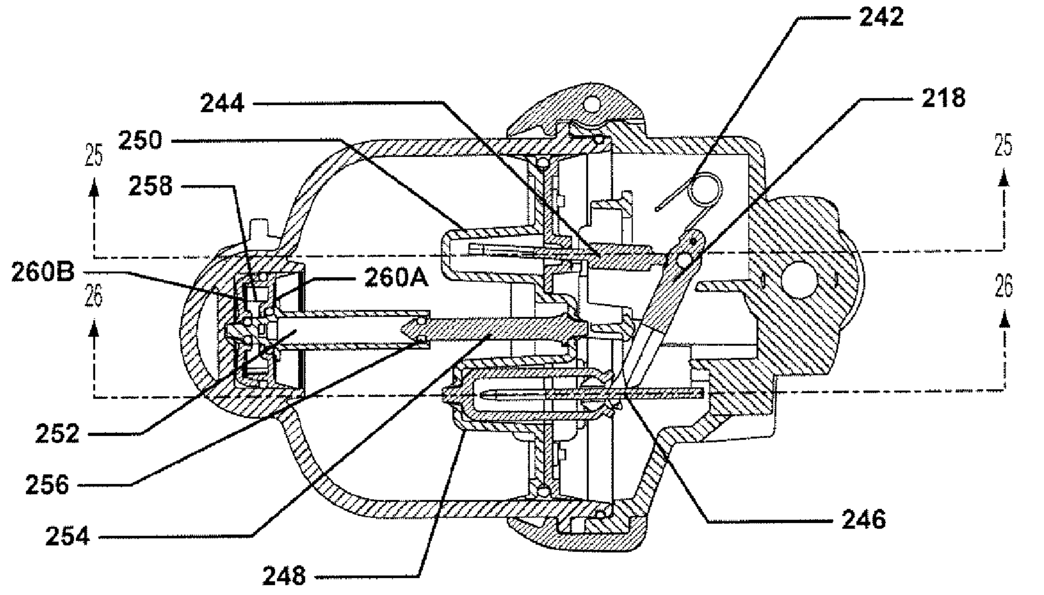
FIG. 22 depicts a cross sectional view taken along line 22-22 of FIG. 20.
Figure 23:
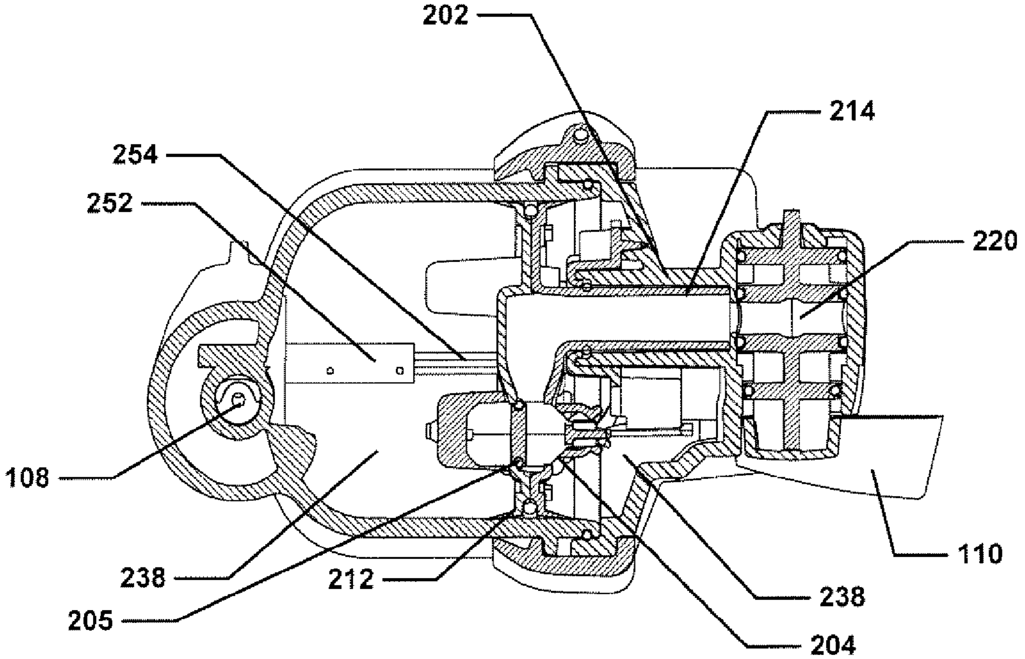
FIG. 23 depicts a cross sectional view taken along line 23-23 of FIG. 20.
Figure 24:
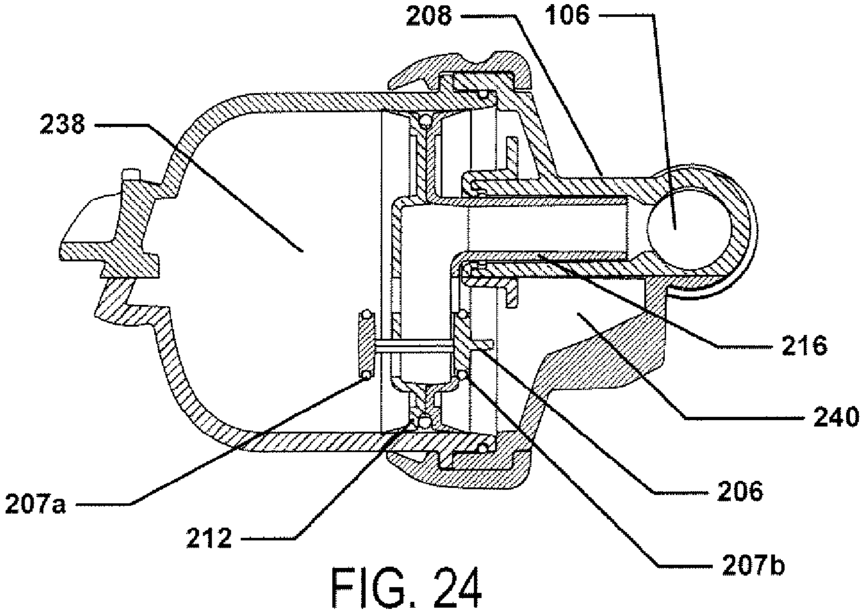
FIG. 24 depicts a cross sectional view taken along line 24-24 of FIG. 20.
Figure 25:
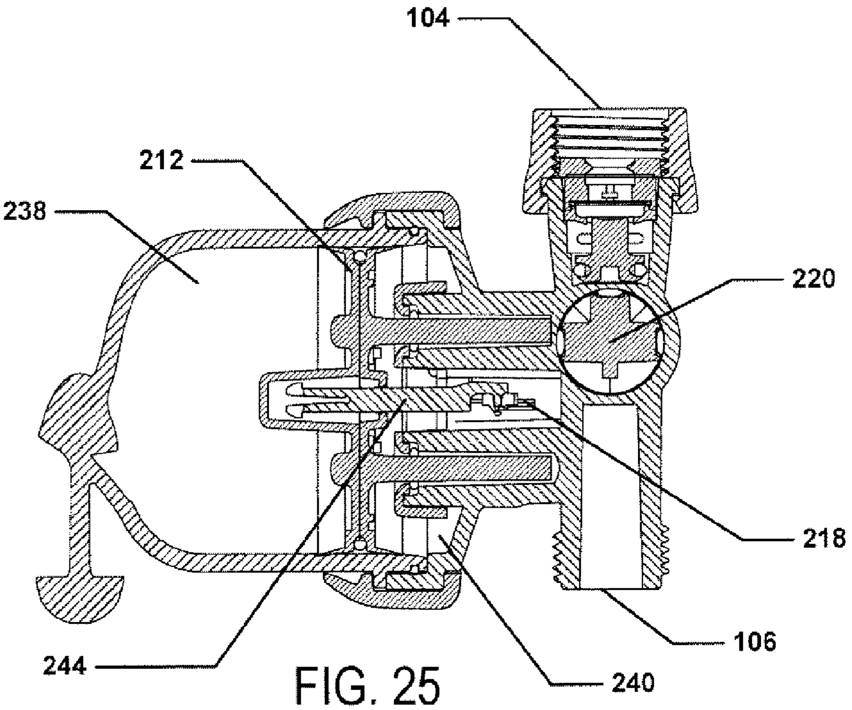
FIG. 25 depicts a cross sectional view taken along line 25-25 of FIG. 22.

The main piston 212 is sealingly mounted in the main body 102 using one or more gaskets or o-rings 213. Hydrophobic or water resistant lubricant may be applied to these gaskets or O-rings 213 to facilitate the rotational movement of the main piston 212. The main piston 212 divides the interior of the main body 102 into two sections: a mixing chamber 238 and a water side 240. The mixing chamber 238 contains both the working fluid and the additive and is where mixing of the two fluids occurs. At start-up of the device 100, the mixing chamber 238 may contain air. The water side 240 is located on the right side of the piston 212 (as shown in FIG. 21, for example), facing the piping section 114, and contains only the working fluid, such as, for example according to exemplary embodiments, water. At start-up of the device 100, the water side 240 may contain air. FIG. 22 depicts the main piston 212 at its starting point of travel on the right side of the main body 102.

In FIG. 22, the toggle linkage 218 can be seen. The toggle linkage is connected to a torsion spring 242. The torsion spring 242 is mounted to the main body 102 at one end and connected at the other end to the toggle linkage. The toggle linkage 218 has a push linkage 244 and a pull linkage 246 connected thereto. The push linkage 244 and the pull linkage 246 extend into housings 248 and 250 as depicted in FIG. 22.

In the mixing chamber 238, there is an extractor piston cylinder 252 in which an extractor piston 254 is slidingly mounted. The extractor piston 254 is sealingly mounted in the extractor piston cylinder 252 using one or more o-rings or gaskets 256. Hydrophobic or water resistant lubricant may be applied to these gaskets or o-rings to facilitate the rotational movement of the extractor piston 254 within the extractor piston cylinder 252. The extractor piston 254 provides vacuum to pull additive fluid from the source attached to the second inlet 108 and then provides pressure to force the additive fluid drawn in the extractor piston cylinder 252 into the mixing chamber 238. To accomplish this, the extractor piston 254 is fixedly mounted to the main piston 212 such that as the main piston 212 reciprocates, the extractor piston 254 also reciprocates. At the base of the extractor piston cylinder 252 is a chamber 258. The upper portion of the chamber 258 is covered by a membrane 260A. The lower portion of the chamber 258 is also covered by a membrane 260B. The membranes 260A and B rest upon a series of openings (not shown). The openings provide a fluid communication path between the chamber 258 and the mixing chamber 238 as well as the chamber 258 and the second inlet 108 (not shown in FIG. 22). The membrane 260 is flexible and fluid impermeable. When the extractor piston 254 is moved (to the right in FIG. 22, for example) by the main piston 212, a vacuum is created and additive is drawn from its container into the chamber 258 past the membrane 260B and then into the extractor piston cylinder 252. This motion causes the membrane 260A to be pressed against the openings and thus sealing the chamber 258 from fluidly communicated with the mixing chamber 238. When the extractor piston 254 is moved (to the left in FIG. 22, for example) into the extractor piston cylinder 252 by the movement of the main piston 212, it applies a pressure to the additive fluid in the extractor piston cylinder 252 and the chamber 258. This fluid pressure causes the additive fluid to press against the membrane 260A and eventually lift the membrane 260A. The membrane 260B is pressed against the bottom of the chamber 258 preventing additional additive fluid from being drawn in. The additive fluid may then flow into the mixing chamber 238. The extractor piston cylinder 252 may be sized to contain a predetermined volume of additive fluid, which, with the fluid volume of the chamber 258, is predetermined to be an amount that is required to be mixed with the working fluid in the mixing chamber 238 to give a desired concentration for application by the device. The membranes 260A and B provide for one way flow of the additive fluid from the second inlet 108 to the mixing chamber 238, preventing backflow.

Figure 63:
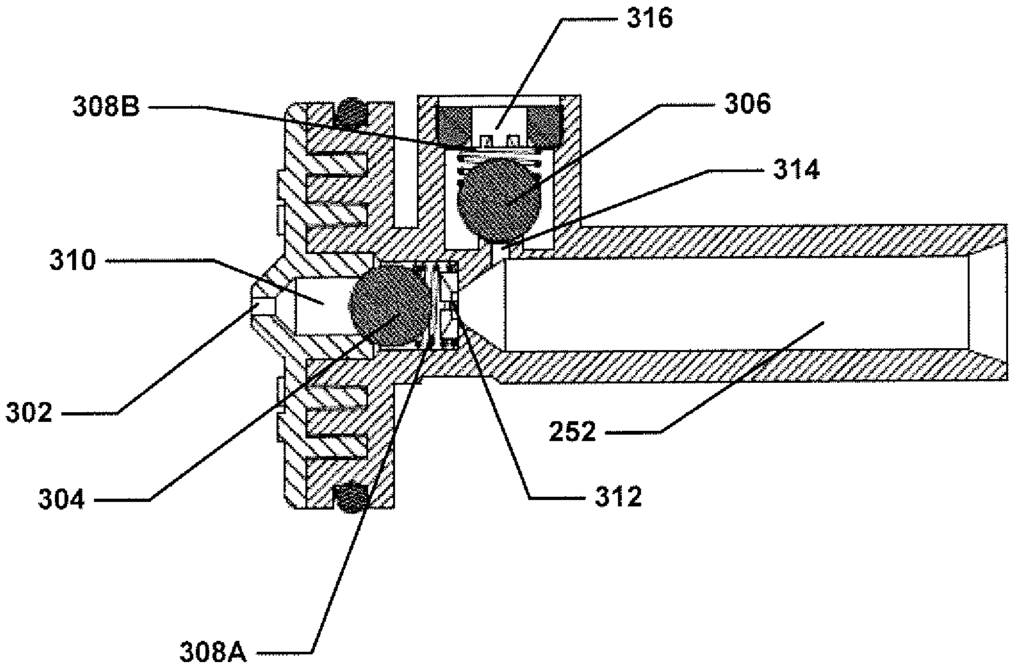
FIG. 63 depicts a cross sectional view of an alternative extractor cylinder inlet and exhaust according to exemplary embodiments.
Figure 64:
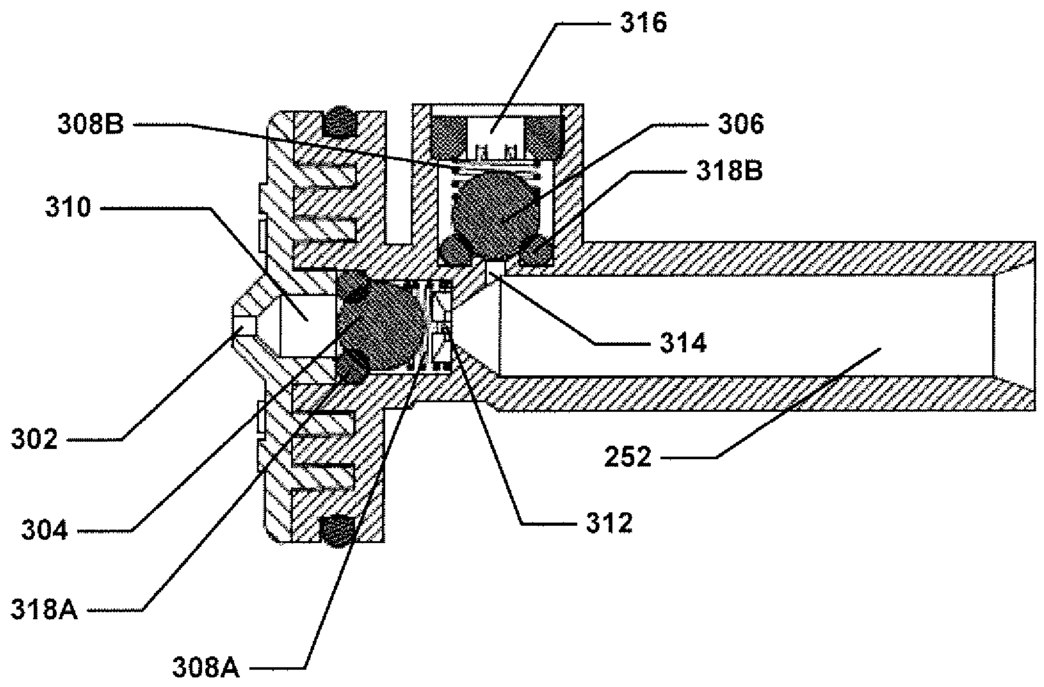
FIG. 64 depicts a cross sectional view of a second alternative extractor cylinder inlet and exhaust according to exemplary embodiments.

FIG. 63 depicts an alternative arrangement for the inlet portion of the extractor piston cylinder 252. This structural configuration would replace the membrane configuration described above to pull additive fluid from the source attached to the second inlet 108 and allow for one way flow of the additive fluid from the second inlet to the mixing chamber 238. The second inlet 108 (not shown in FIG. 63) is fluidly coupled to an additive inlet 302 which exhausts into an inlet chamber 310. The inlet chamber 310 has a first check ball 304 at its opposing end from the additive inlet 302. The first check ball 304 is located over an additive exhaust 312. The additive exhaust 312 is fluidly coupled to the extractor piston cylinder 252. Ninety degrees from the additive exhaust 312 is a second additive inlet 314. A second check ball 306 is located between the second additive inlet 314 and a second additive exhaust 316. The first and second check balls are held in sealing position by compression springs 308A and 308B. The springs 308A and B provide force on the check balls to assist with maintaining a seal during vibrational movement of the device. In FIG. 63, both the check valve balls are depicted in their sealed positions as held by the springs 308A and B. The check valve balls may seal by contact with the surrounding plastic structure of the device at the top portion of the inlet chamber 310 and the second additive inlet 314. The check valve balls may travel a limited distance between their seated and unseated positions. The springs may limit this travel when the check valve balls are unseated to allow fluid flow past the check valve balls. A stop (not shown) may be used to limit the check valve ball travel. FIG. 64 provides a second alternative embodiment of the check valve structure. FIG. 64 has similar structure to that of FIG. 63 and has been labeled in a similar fashion. However, the embodiment depicted in FIG. 64 has as a set of o-rings 318A and 318E to provide a seal for the check valve balls 304 and 306. The check valve balls may be held against the o-rings 318A and B by the springs 308A and 308B as shown in FIG. 64. The o-rings may be constructed from any suitable material, such as, for example, rubber, teflon, or plastic. The o-rings may further be coated with an appropriate hydrophobic lubricant, such as, for example, silicon.

In operation, extractor piston 254 moves in the extractor piston cylinder 252 (the extractor piston 254 is not shown in FIG. 63) as described herein. Upon movement of the extractor piston 254 to the right (with respect to FIG. 63), the first check ball 304 is lifted from its sealed position against the inlet chamber 310 right hand portion. This movement allows additive to be drawn from the additive source through the second inlet 108 and through the additive inlet 302 into and through the inlet chamber 310, past the first check ball 304 and through the additive exhaust 312. The additive fluid fills the extractor piston cylinder 252. The second additive inlet 314 remains sealed by the second check ball 306.

Upon movement of the extractor piston 254 to the left (with respect to FIG. 63), the first check ball 304 is seated against the right hand side of the inlet chamber 310 and the second check ball 306 is lifted from the second additive inlet 314 allowing the additive fluid to exit the extractor piston cylinder 252 and flow through the second additive exhaust 316 into the mixing chamber 238. The process repeats as the device is operated as described herein.

In operation, an external source of working fluid is attached to the first inlet 104 of the device 100. For example, the external source may be a hose or a spigot. According to exemplary embodiments, the working fluid may be water. Operation of the device 100 will be described using water as the working fluid, but this is meant to be a non-limiting example. A second hose or other external fluid conveyance apparatus is attached to the fluid exhaust 106 of the device 100 to receive and convey the outlet stream of fluid. A nozzle or spraying device may be attached to the fluid exhaust 106 or to the end of the second hose to provide for application of the fluid to a surface or object.

A chemical source is attached to the second inlet 108. The chemical source may be a bottle or other container configured to mate with the second inlet 108. According to exemplary embodiments, the chemical source contains a liquid additive that is to be mixed with water for agricultural or lawn and garden applications. The device 100 is configured to mix a predetermined quantity of this additive with the working fluid to provide a mixture for dispensing from the device.

The first part of operation of the device is the intake stage. The component positions at the start of this stage are depicted in FIGS. 21-26. FIGS. 27-32 depict an intermediate position of this stage.

In exemplary embodiments, the selector switch 110 is positioned for operation of the device in the desired mode. The selector switch 110 that is operably attached to the selector valve 220 determines the flow path of the water by altering the position of the selector valve 220. The selector switch 110 has two positions. The two positions are "Feed" and "Water." The selector switch 110 is configured to be manually rotated between these positions. Operation of the selector switch 110 moves a two-position selector valve 220 connected thereto. In the "Feed" position, water is ported into the selector valve conduit 222 through the tube 214 towards the intake valve 204. In the "Water" position, the water is ported straight through selector valve conduit 222 through the opening 230 and then through the piping section 114 to the fluid exhaust 106 and the water does not enter the main body 102 of the device. In this position, the device acts as a mere conduit between the external source and the second hose or attachment to the fluid exhaust 106.

As described above, in some embodiments, the device 100 may lack the selector switch 110 and have the selector valve 220 in a fixed position (the "Feed" position as described herein). In these embodiments, the device 100 may always be in a mixing mode such that the working fluid is always ported to the interior of the main body.

The operation of the device with the selector switch 110 in the "Feed" Position will be described. When the device is first used, the first intake stage also serves as a priming stage for the device. During the intake stage, water from the external source enters the first inlet 104 of the device 100. The water flows through the anti-siphon valve 232 and into the inlet throat 234. The water then enters the selector valve conduit 222 and exits at the selector valve outlet 228. The water then enters the tube 214 located within the intake conduit 202. Water finally enters the water side 240 of the master piston 212 through the intake valve 204. As can be seen in the Figures, the water side 240 of the master piston 212 is opposite to the mixing chamber 238. As the water side 240 fills with water, the water pressure pushes the master piston 212 toward the mixing chamber 238.

As the master piston 212 translates, the extractor piston 254, connected to the master piston 212 is translated in the same direction. The extractor piston 254 pushes air into the mixing side 238 from the extractor piston cylinder 252 through the membrane 260A as described above. This air exits out of the exhaust valve 206 through the exhaust conduit 208 through the tube 216 and finally exits the device through the fluid exhaust 106. Thus, in the intake and priming stages, the intake valve 204 is open to the water side 238 of the master piston 212 and closed to the mixing chamber 238 and the exhaust valve 206 is open to the mixing chamber 238 and closed to the water side 238. It should be noted that air will be present in the extractor piston cylinder only during the priming stage (initial intake stage) during operation when the device is empty of fluid. It should be appreciated that the device may use the check valve ball structure depicted in FIG. 63 or 64 rather than the membrane arrangement of FIG. 21. The operation of the check valve ball structure is described above. The priming, intake, and exhaust stages operate in a similar manner with the use of two check ball valves instead of the membrane structure.

FIGS. 27-32 and 33-38 depict the next operational positions. The travel of the mater piston 212 can be seen by comparing FIGS. 21, 27, and 33, for example. The translation of master piston 212 causes the tubes 214 and 216 to move to the left (as shown in the Figures) out of the intake conduit 202 and the exhaust conduit 208; however, the tubes remain in contact with these conduits to provide a fluid flow path.

As the master piston 212 translates further and reaches its end of travel (depicted in FIG. 33-38), the push linkage 244 contacts the master piston 212 at point 264 and rotates the toggle linkage 218. The toggle linkage 218 quickly snaps forward as the torsion spring 242 passes through an over-center state. The toggle linkage 218 has two stable positions, one on each side of the over-center state. As the toggle linkage snaps forward, the pull linkage 246 engages the valve bridge 210 at point 266, which connects the intake and exhaust valves together. With the toggle linkage 218 in the forward state, the pull linkage 246 prevents the exhaust and intake valves from translating along further with the master piston 212. The valve bridge 210 overcomes the valve detent setting, and the exhaust valve 206 is closed on the mixing side 238. At the same time, the intake valve 204 is closed on the water side 240. Thus, the exhaust valve 206 is now open on the water side 238 and the intake valve 204 is now open on the mixing side 238.

Figure 34:
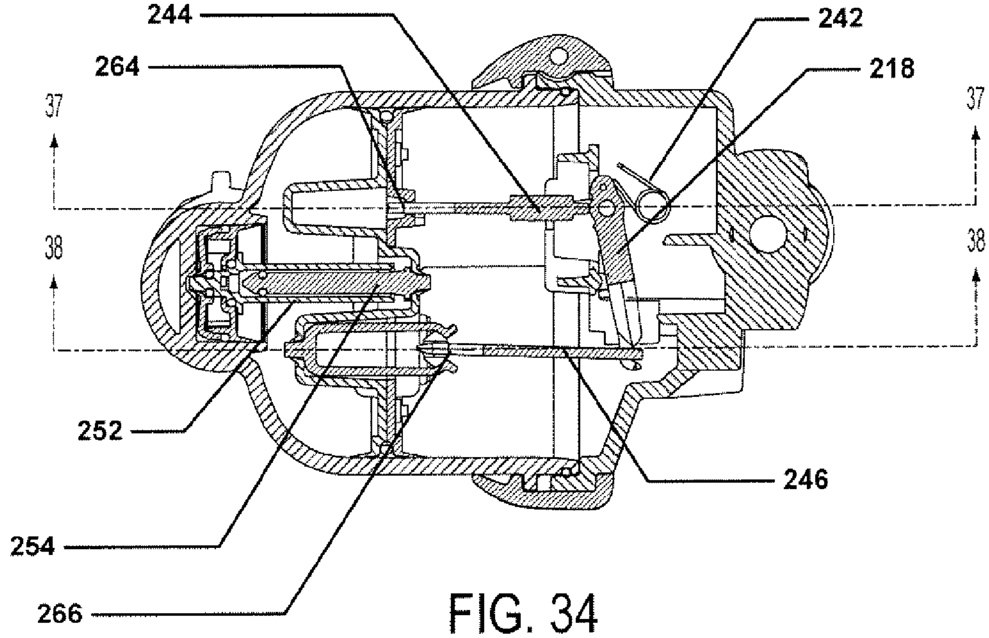
FIG. 34 depicts the cross sectional view taken along line 22-22 of FIG. 20 with the internal structure shown in a different position.
Figure 35:
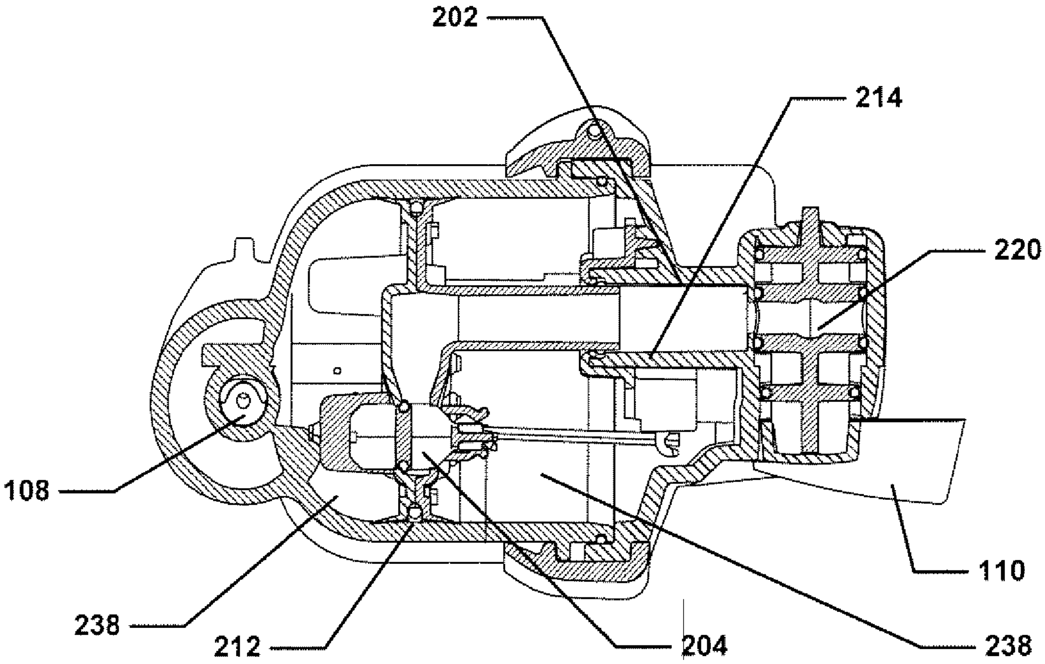
FIG. 35 depicts the cross sectional view taken along line 23-23 of FIG. 20 with the internal structure shown in a different position.
Figure 36:
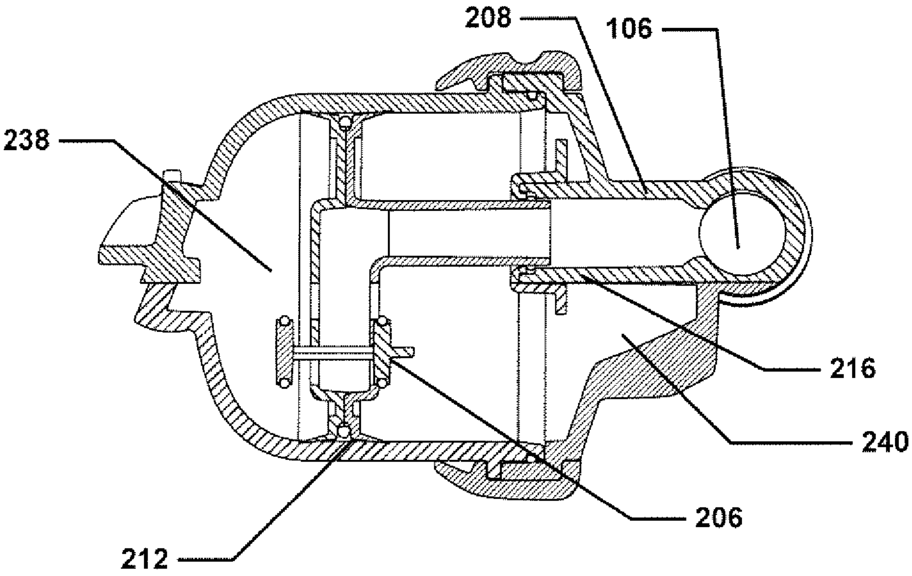
FIG. 36 depicts the cross sectional view taken along line 24-24 of FIG. 20 with the internal structure shown in a different position.
Figure 37:
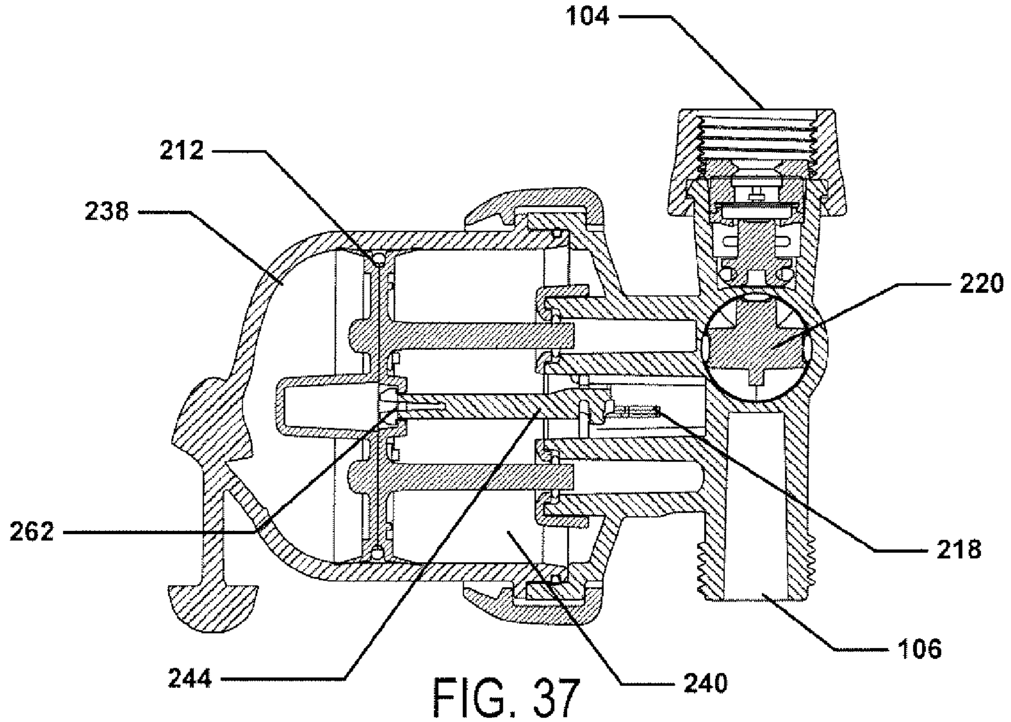
FIG. 37 depicts a cross sectional view taken along line 37-37 of FIG. 34.
Figure 38:
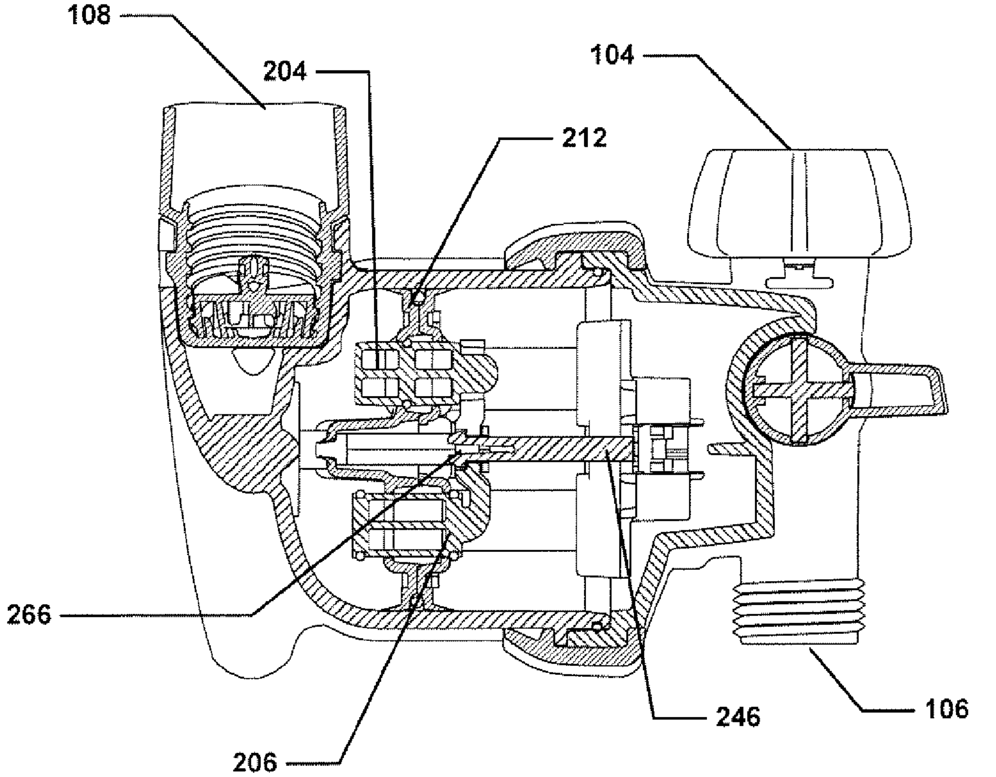
FIG. 38 depicts a cross sectional view taken along line 38-38 of FIG. 34.
Figure 39:
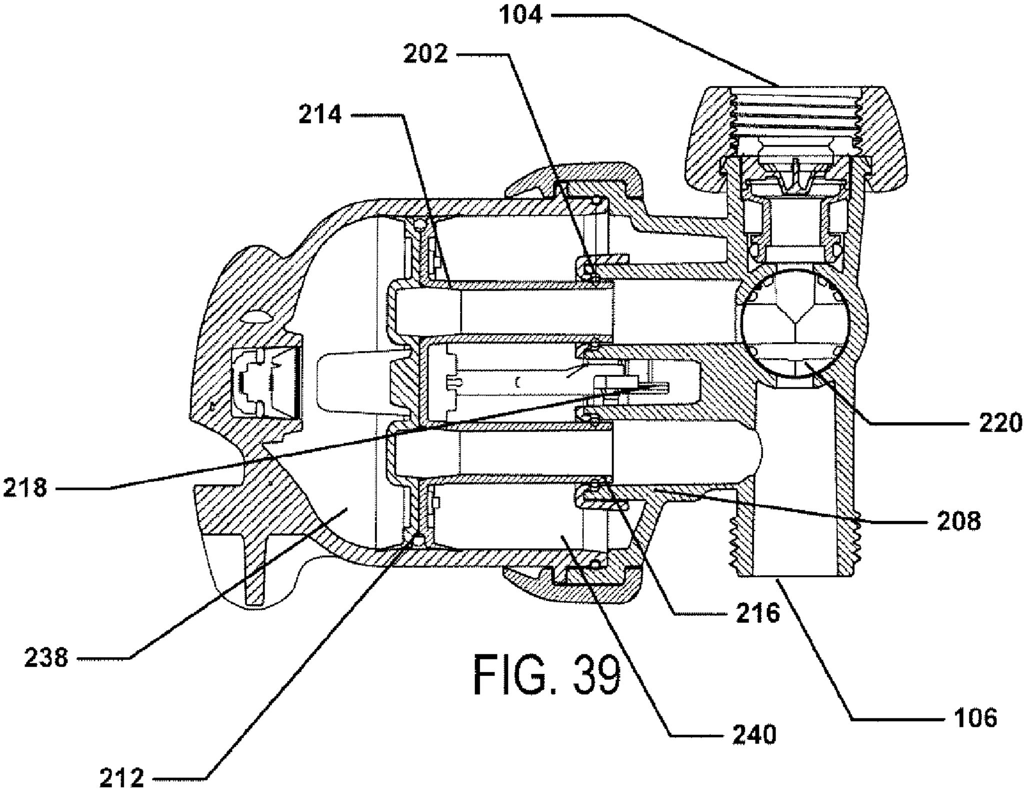
FIG. 39 depicts the cross sectional view taken along line 21-21 of FIG. 19 with the internal structure shown in a different position.
Figure 40:
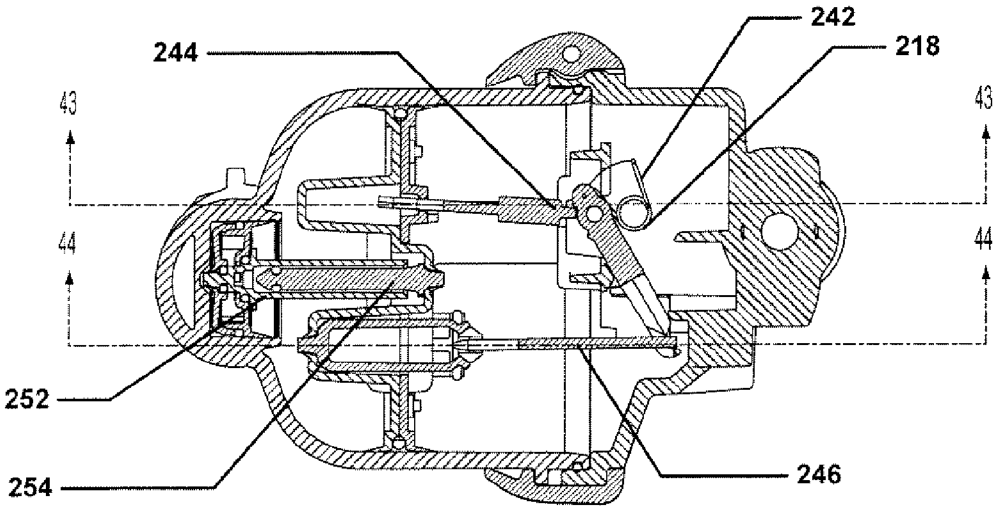
FIG. 40 depicts the cross sectional view taken along line 22-22 of FIG. 20 with the internal structure shown in a different position.
Figure 41:
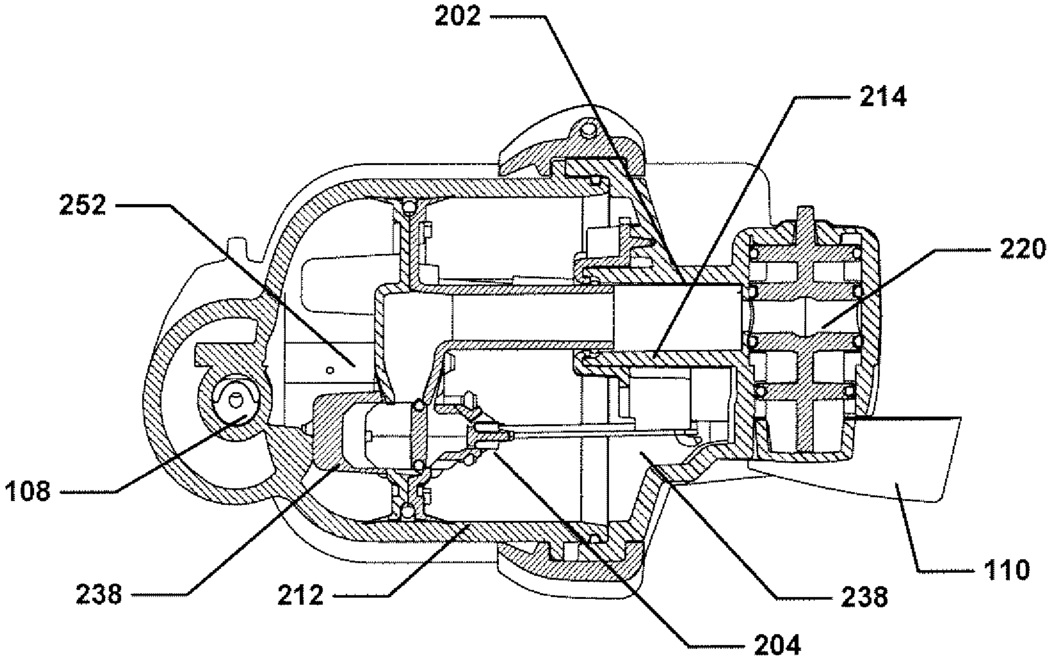
FIG. 41 depicts the cross sectional view taken along line 23-23 of FIG. 20 with the internal structure shown in a different position.
Figure 42:
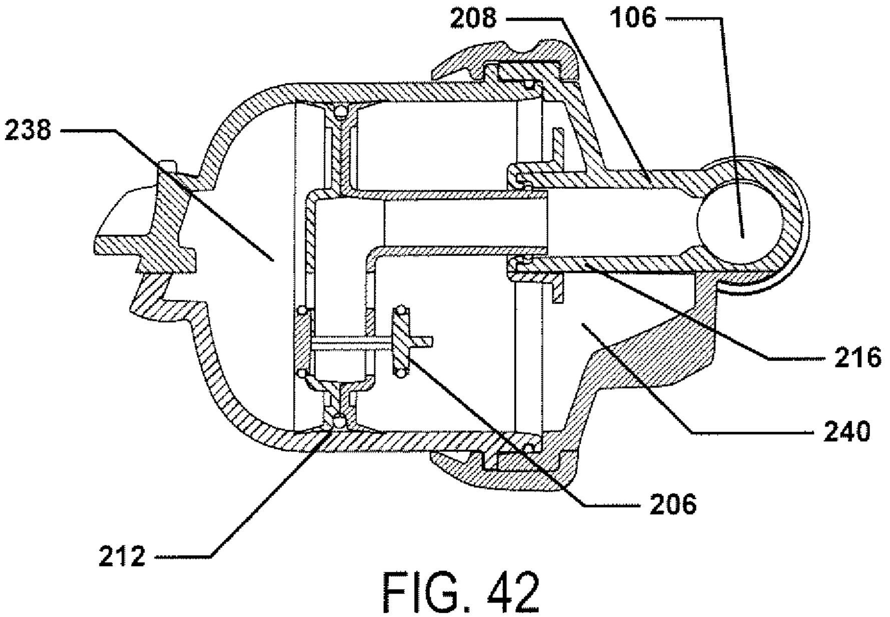
FIG. 42 depicts the cross sectional view taken along line 24-24 of FIG. 20 with the internal structure shown in a different position.
Figure 43:
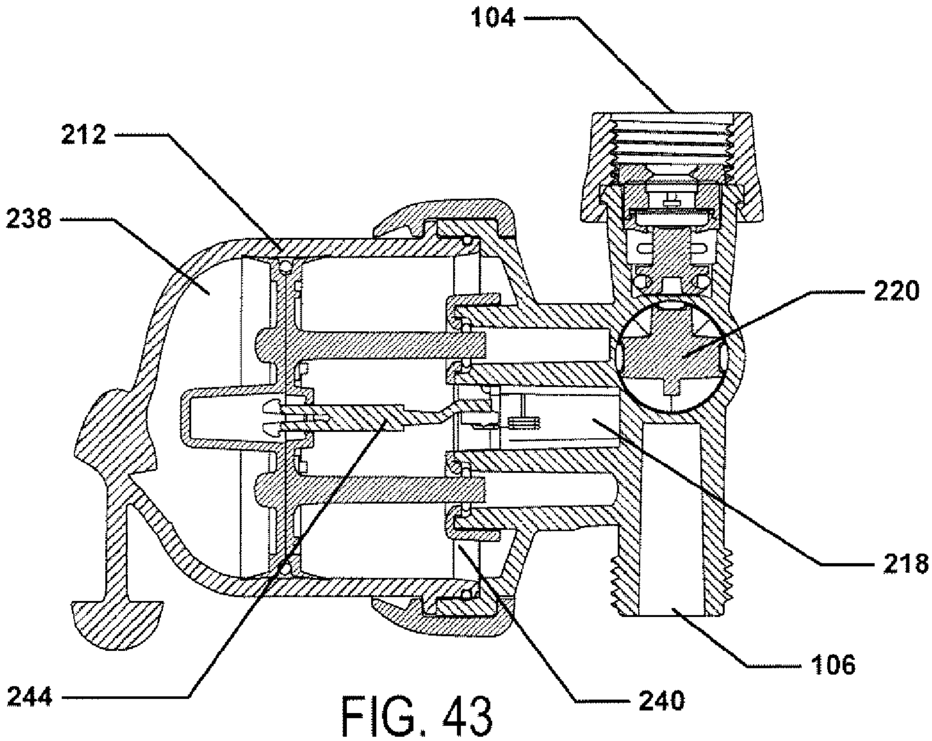
FIG. 43 depicts a cross sectional view taken along line 43-43 of FIG. 40.
Figure 44:
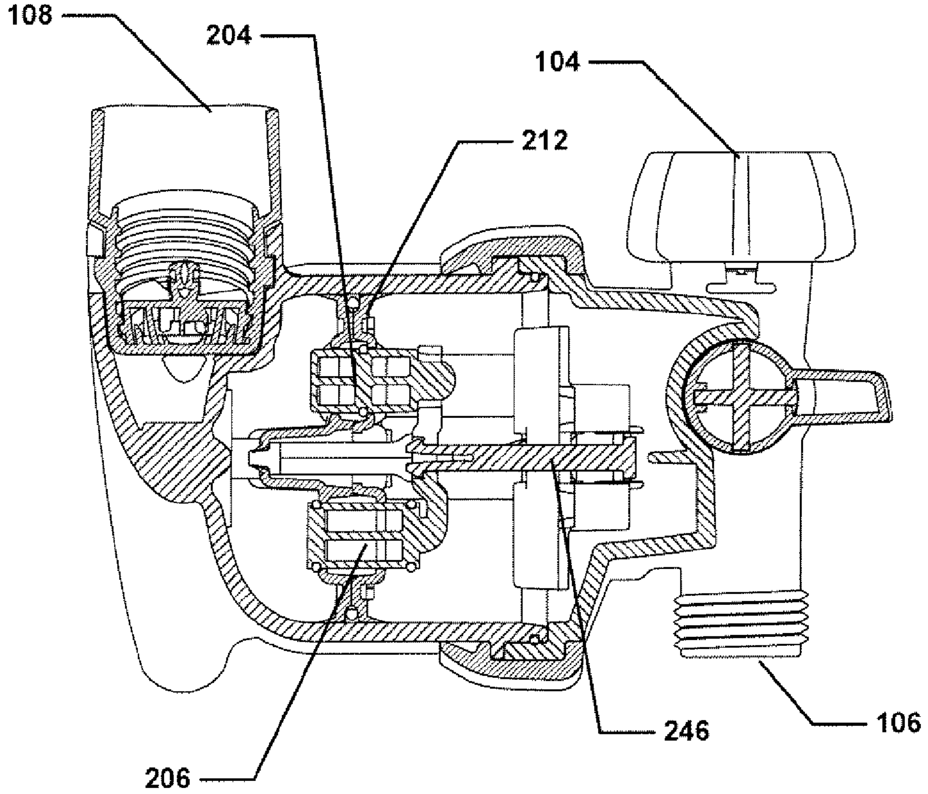
FIG. 44 depicts a cross sectional view taken along line 44-44 of FIG. 40.
Figure 45:
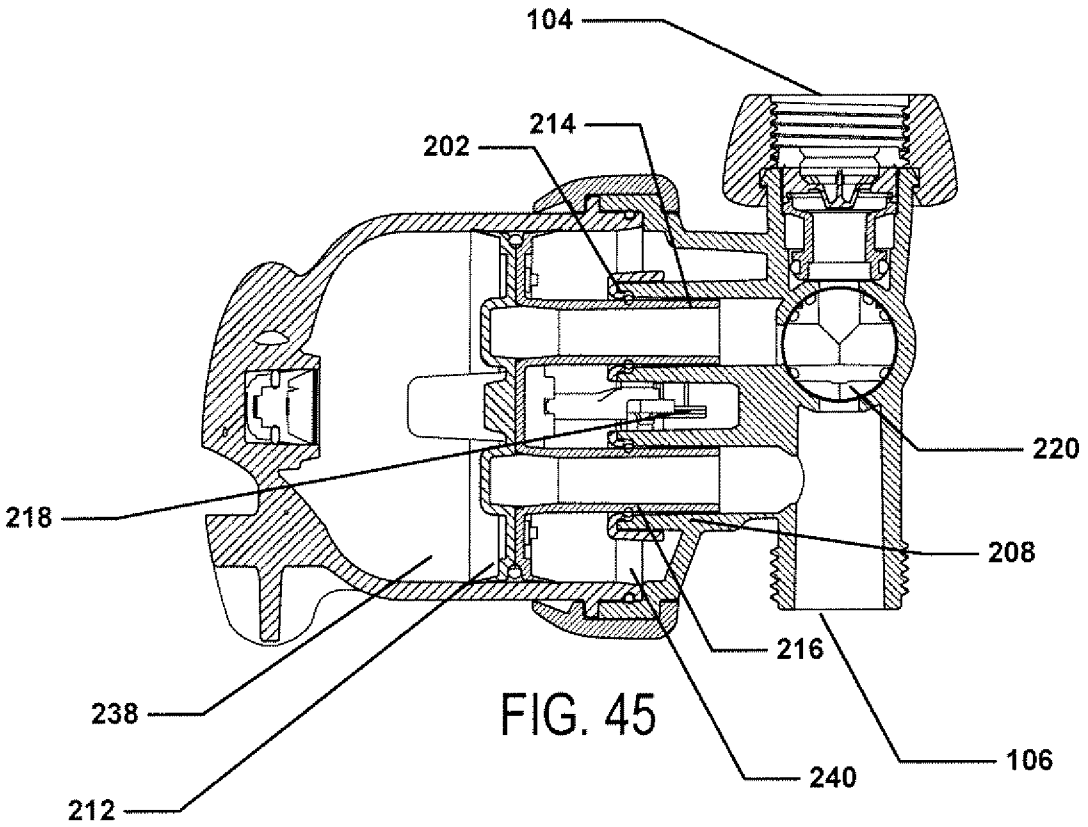
FIG. 45 depicts the cross sectional view taken along line 21-21 of FIG. 19 with the internal structure shown in a different position.
Figure 46:
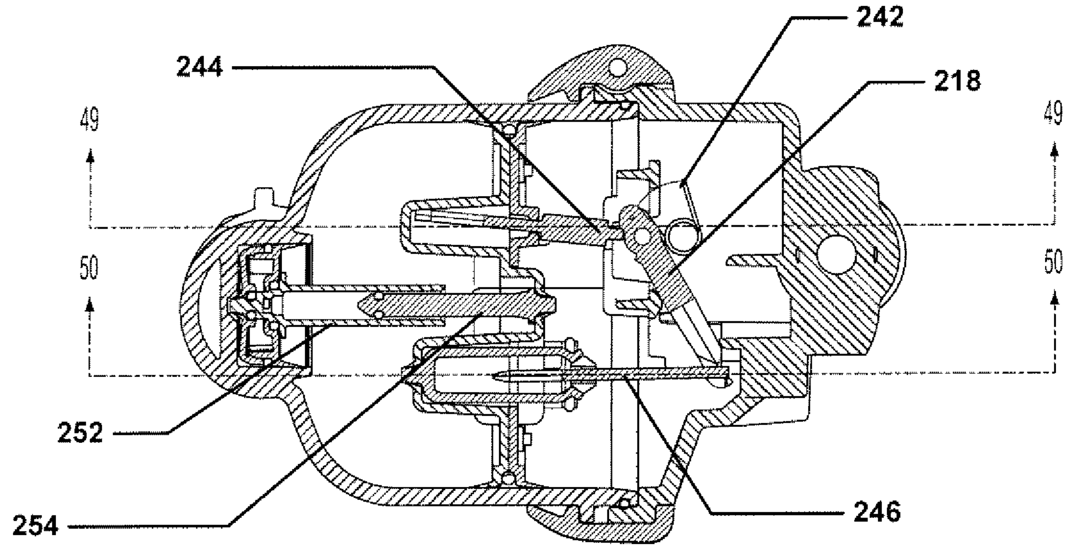
FIG. 46 depicts the cross sectional view taken along line 22-22 of FIG. 20 with the internal structure shown in a different position.
Figure 47:
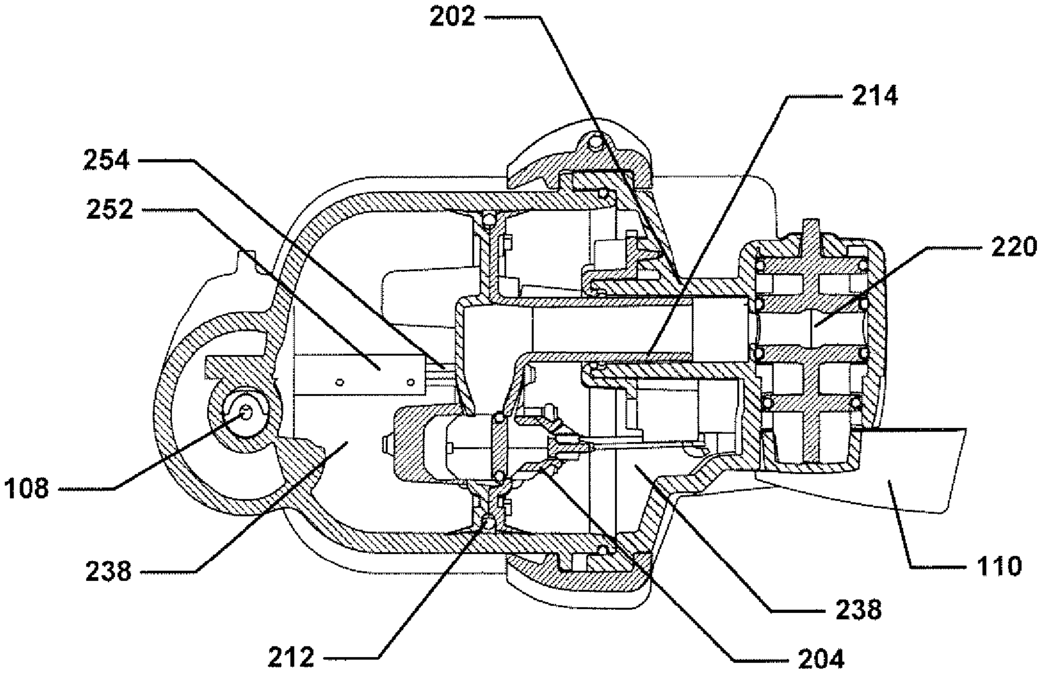
FIG. 47 depicts the cross sectional view taken along line 23-23 of FIG. 20 with the internal structure shown in a different position.
Figure 48:
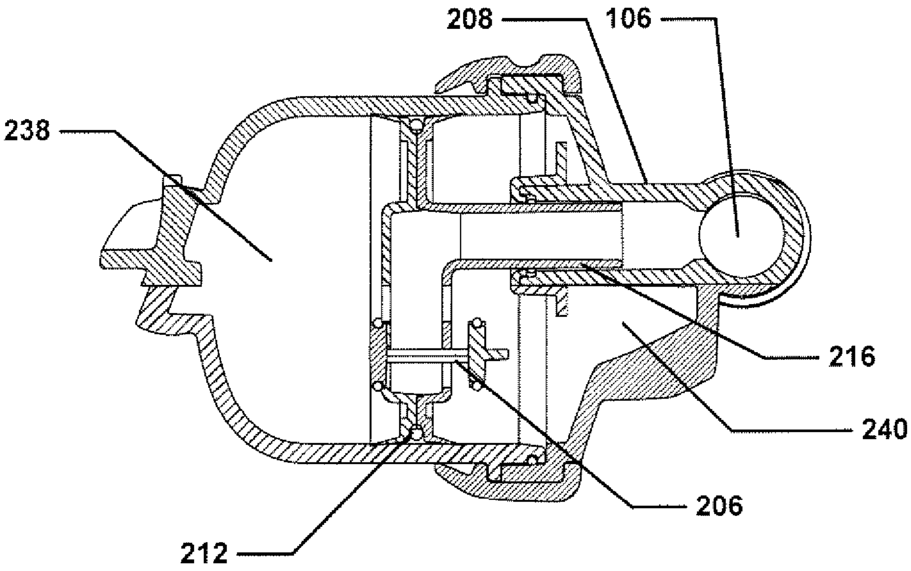
FIG. 48 depicts the cross sectional view taken along line 24-24 of FIG. 20 with the internal structure shown in a different position.
Figure 49:
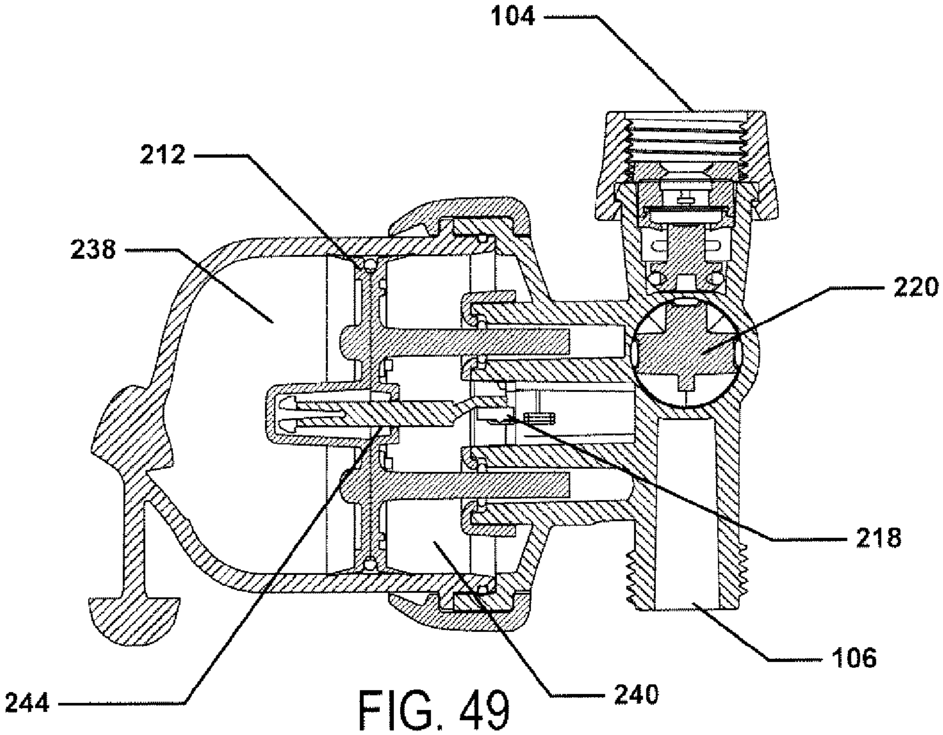
FIG. 49 depicts a cross sectional view taken along line 49-49 of FIG. 46.
Figure 50:
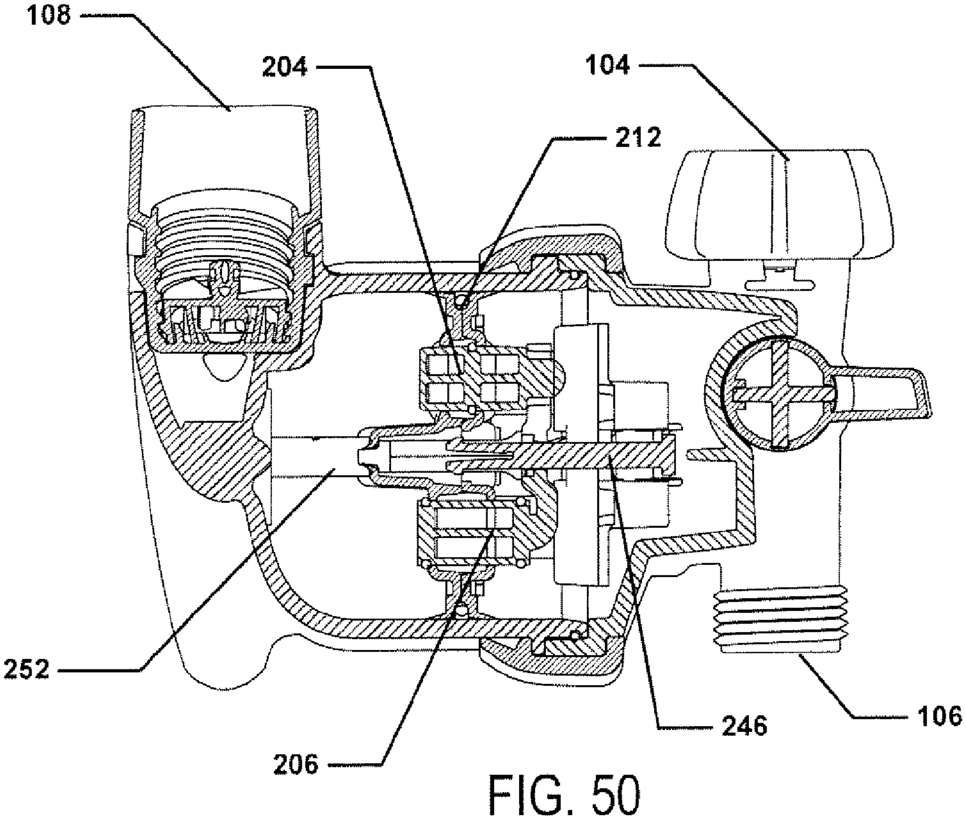
FIG. 50 depicts a cross sectional view taken along line 50-50 of FIG. 46.
Figure 51:
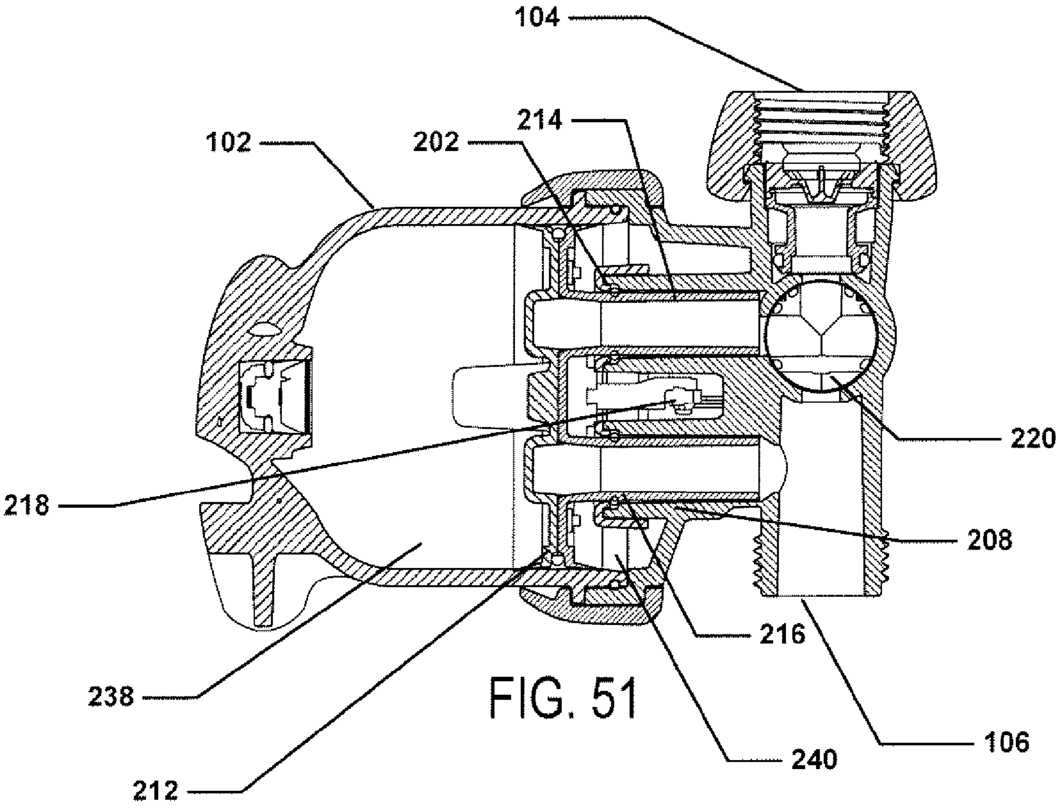
FIG. 51 depicts the cross sectional view taken along line 21-21 of FIG. 19 with the internal structure shown in a different position.
Figure 52:
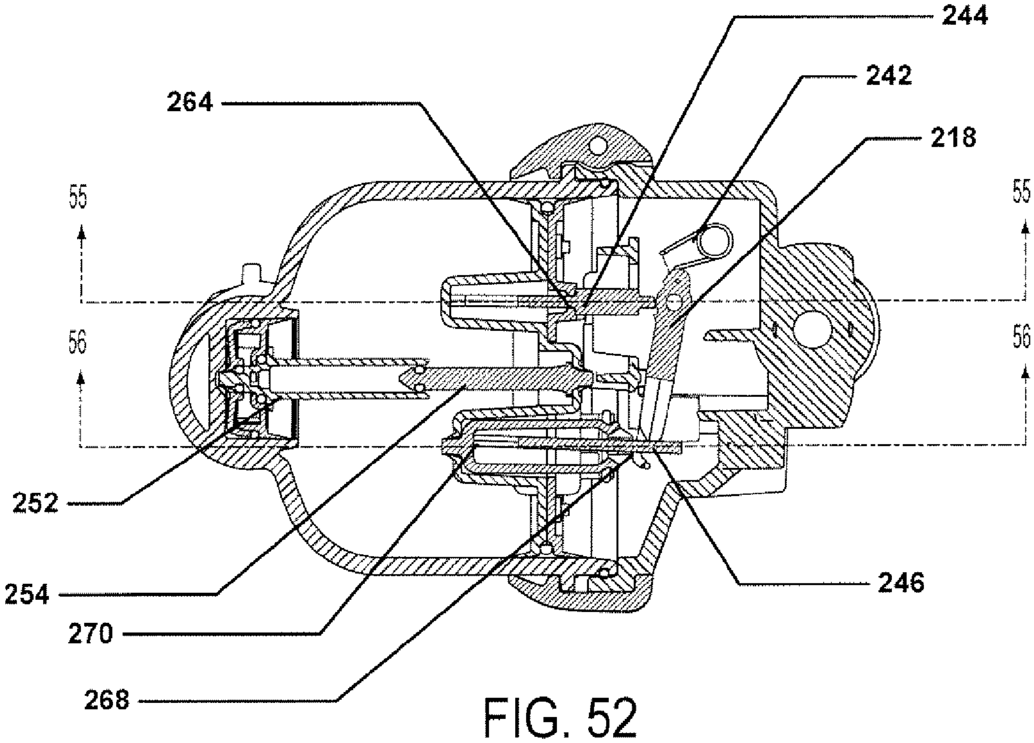
FIG. 52 depicts the cross sectional view taken along line 22-22 of FIG. 20 with the internal structure shown in a different position.
Figure 53:
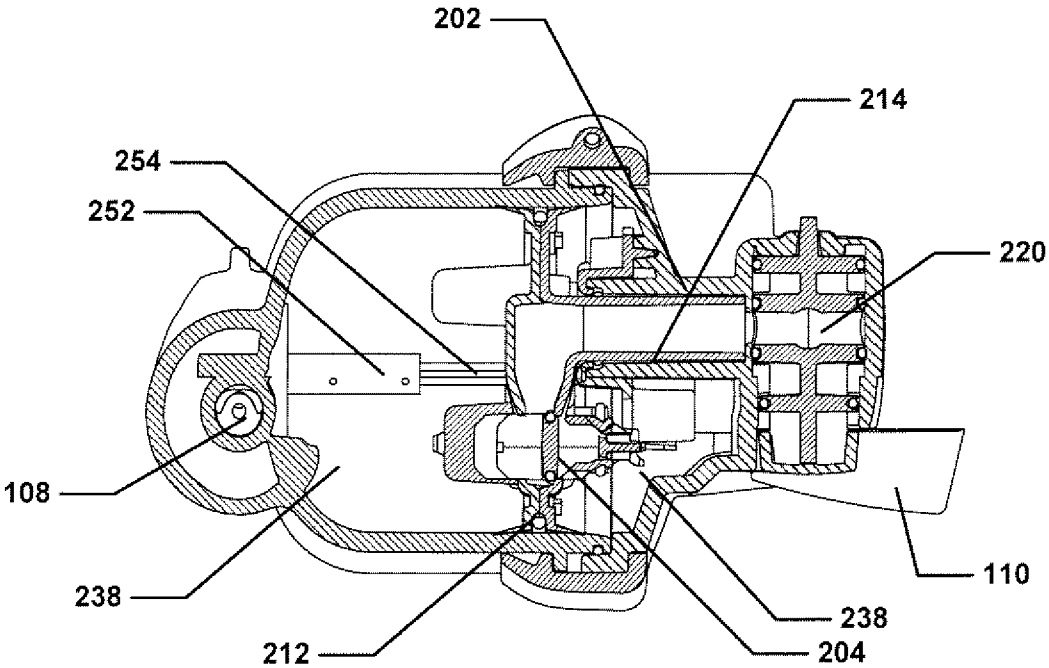
FIG. 53 depicts the cross sectional view taken along line 23-23 of FIG. 20 with the internal structure shown in a different position.
Figure 54:
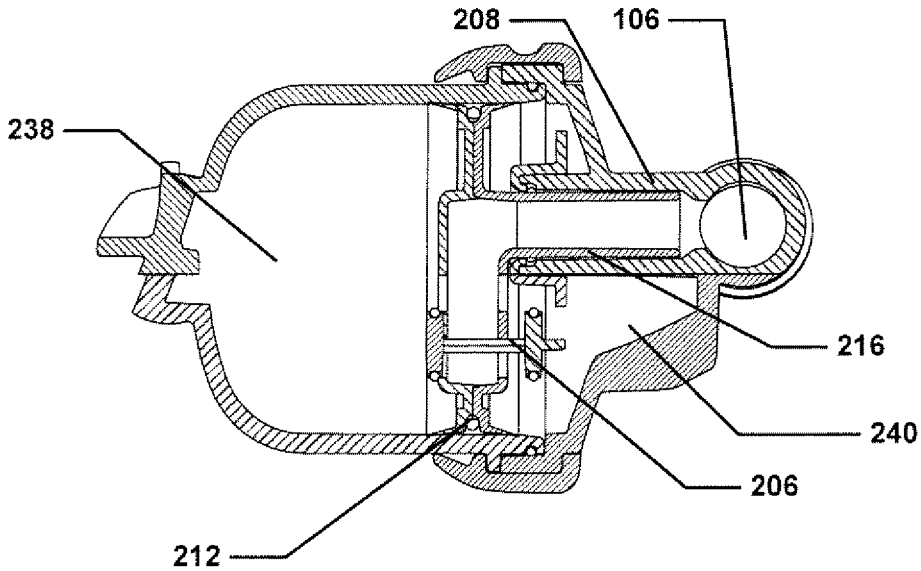
FIG. 54 depicts the cross sectional view taken along line 24-24 of FIG. 20 with the internal structure shown in a different position.
Figure 55:
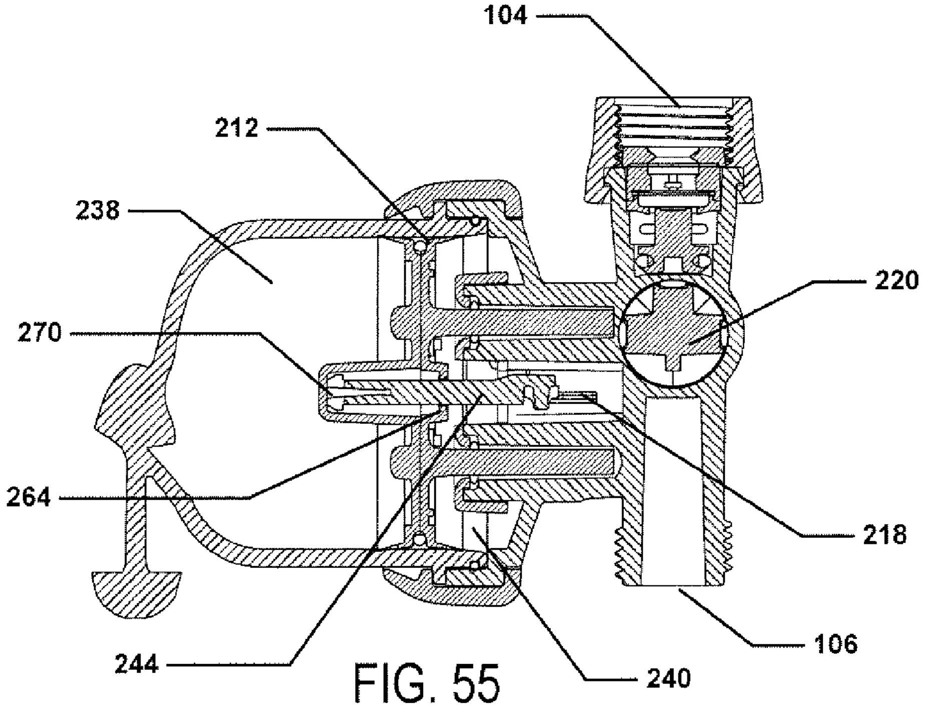
FIG. 55 depicts a cross sectional view taken along line 55-55 of FIG. 52.
Figure 56:
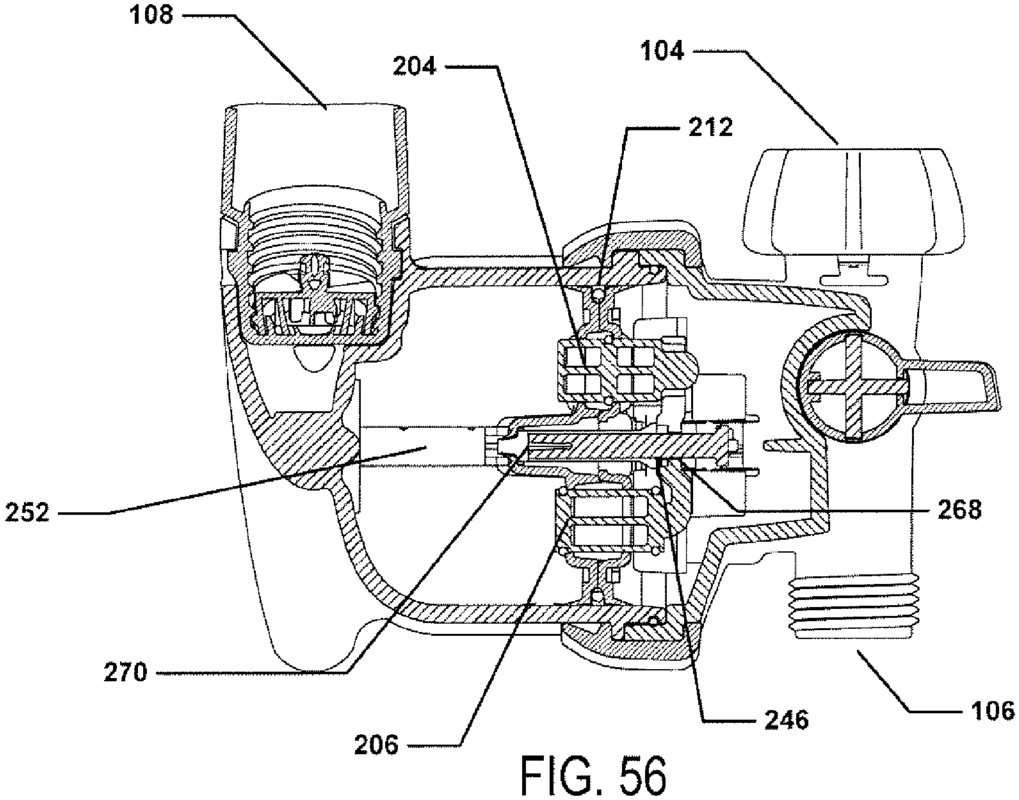
FIG. 56 depicts a cross sectional view taken along line 56-56 of FIG. 52.
Figure 57:
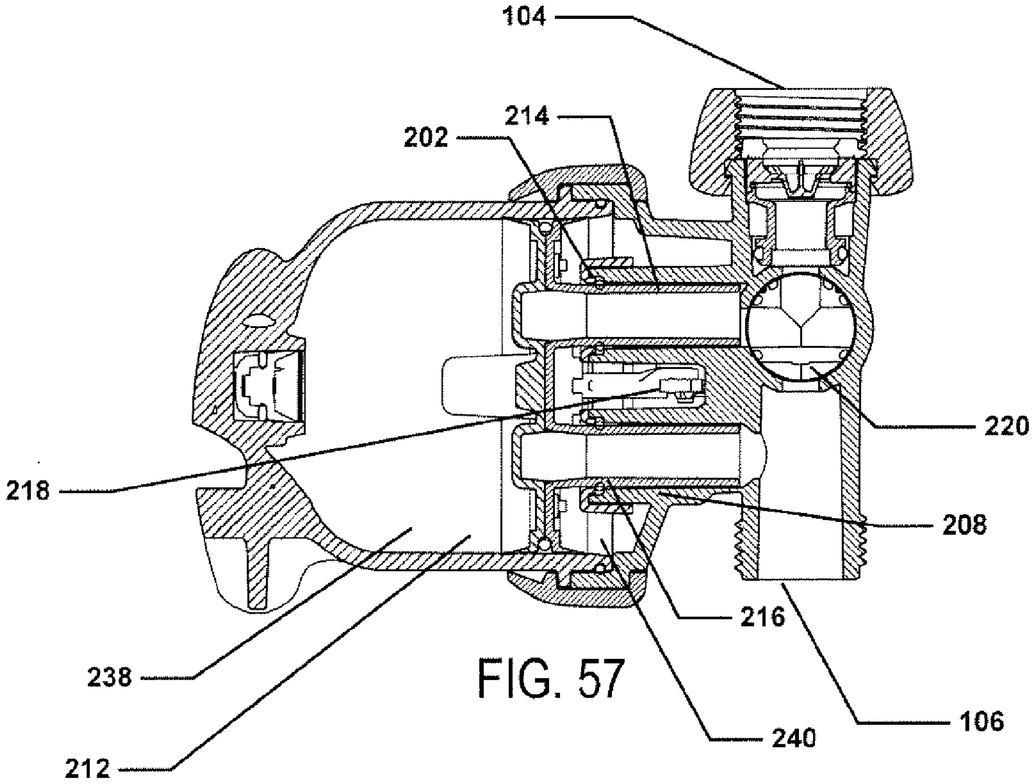
FIG. 57 depicts the cross sectional view taken along line 21-21 of FIG. 19 with the internal structure shown in a different position.
Figure 58:
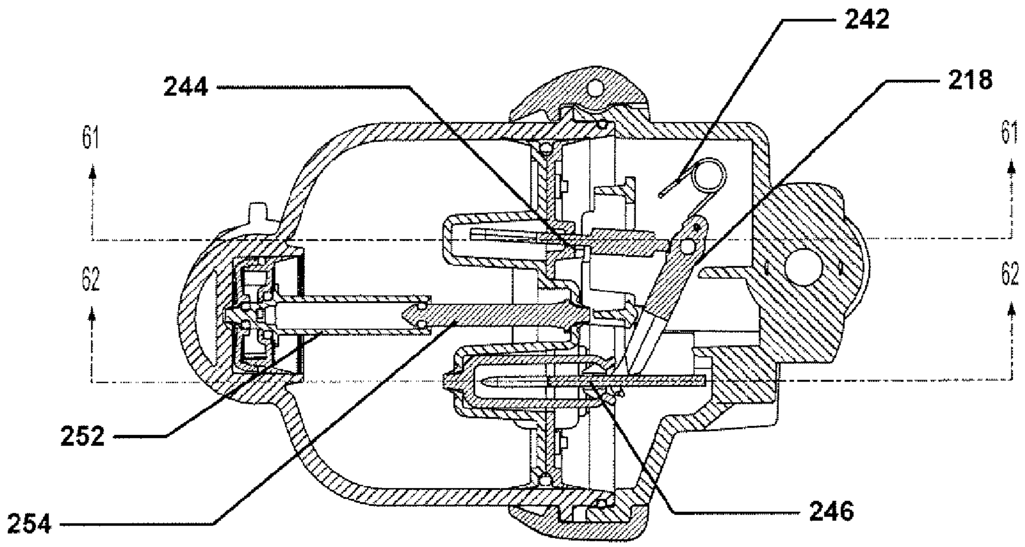
FIG. 58 depicts the cross sectional view taken along line 22-22 of FIG. 20 with the internal structure shown in a different position.
Figure 59:
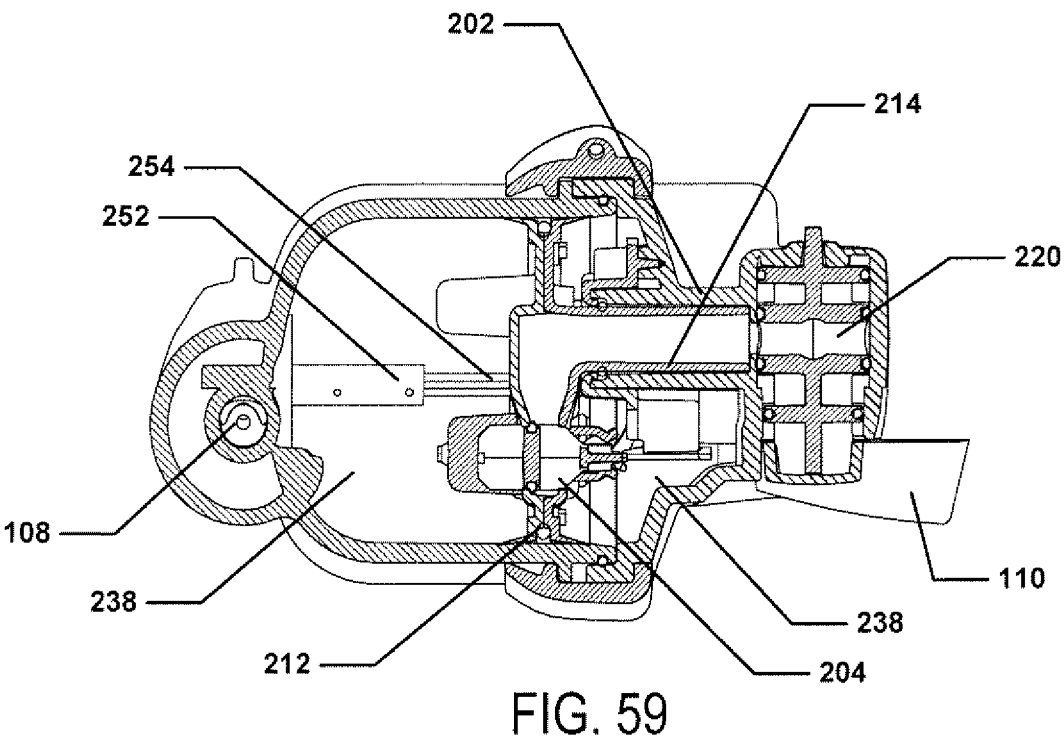
FIG. 59 depicts the cross sectional view taken along line 23-23 of FIG. 20 with the internal structure shown in a different position.
Figure 60:
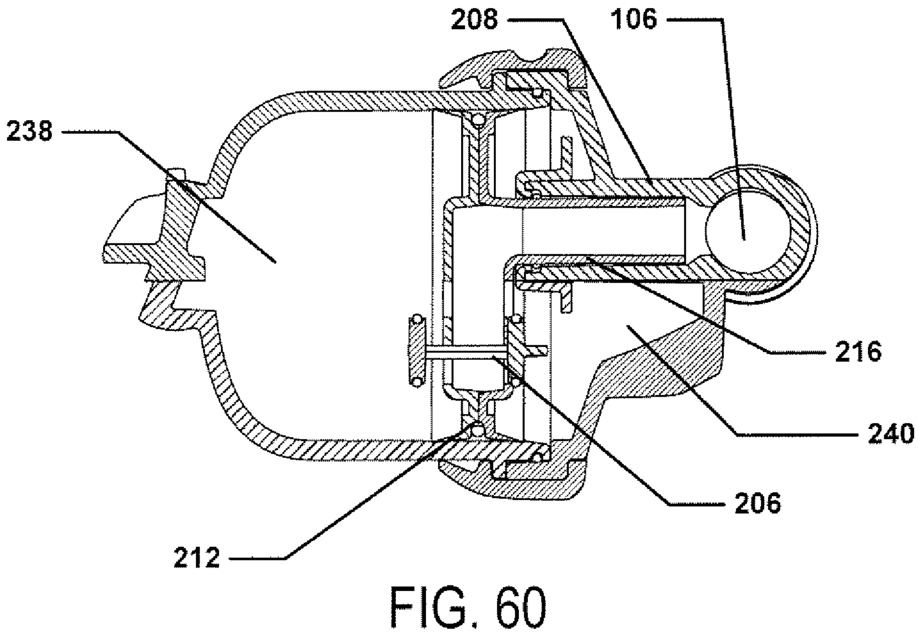
FIG. 60 depicts the cross sectional view taken along line 24-24 of FIG. 20 with the internal structure shown in a different position.
Figure 61:
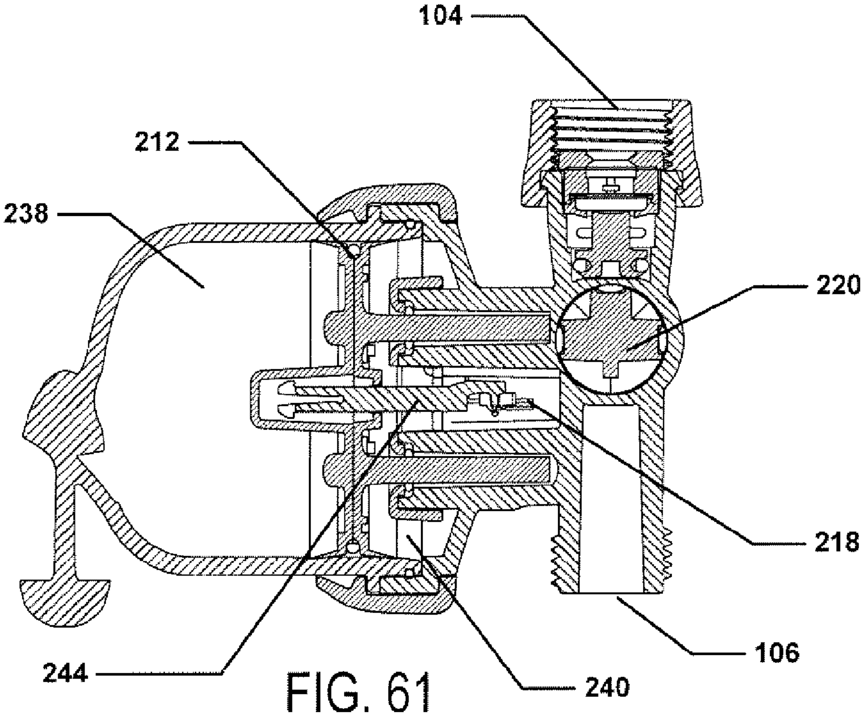
FIG. 61 depicts a cross sectional view taken along line 61-61 of FIG. 58.
Figure 62:
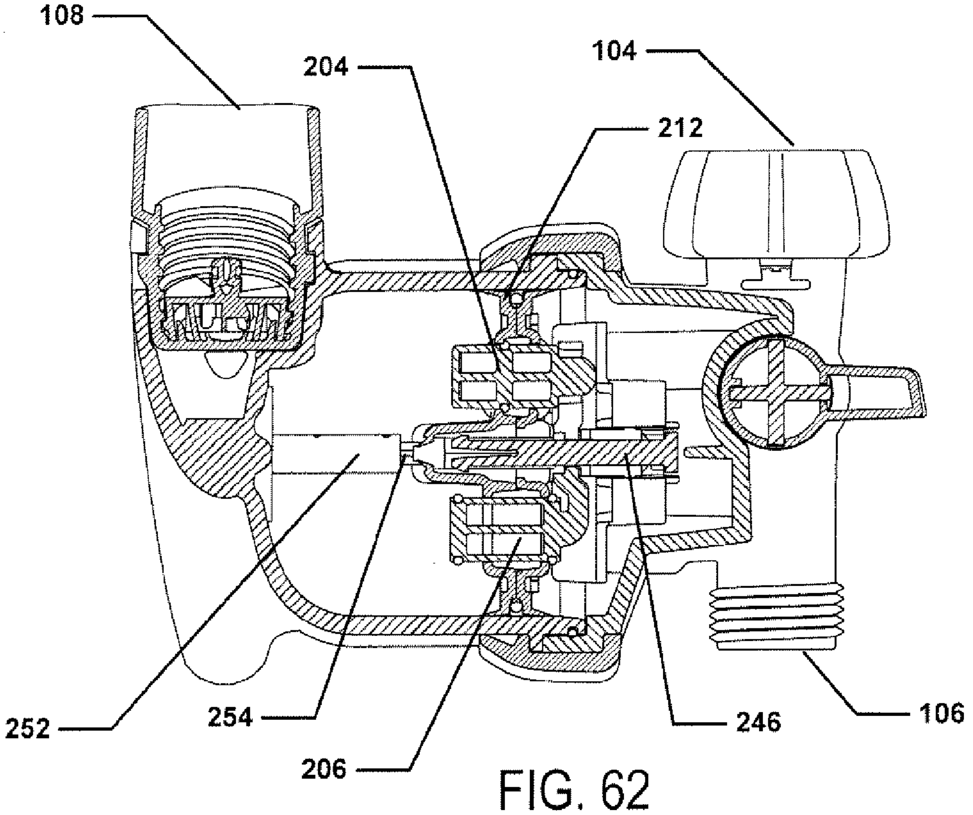
FIG. 62 depicts a cross sectional view taken along line 62-62 of FIG. 58.

The extractor piston 254 is at the leftmost side of the extractor piston cylinder 252 as depicted in FIG. 34, for example. All fluid has thus been expelled from the extractor piston cylinder 252.

FIGS. 39-44 depict the device with the intake and exhaust valves in this new position, which is opposite to that of the intake stage. The water input stage to the mixing chamber now begins.

Water, through the intake valve 204, now enters the mixing side 238. As the mixing side 238 fills with water, the water pressure pushes the master piston 212, in the opposite direction; that is, towards the water side 240. As the master piston 212 translates in this direction, the extractor piston 254 pulls the chemical additive into the extractor piston cylinder 252 by creating a vacuum. The extractor piston cylinder 252 is sized to contain a predetermined amount of chemical additive. This predetermined amount is based on the desired ratio of chemical to water volume in the mixing side. FIGS. 45-50 and 51-56 depict the translation of the master piston 212 from the position of FIGS. 39-44.

As the master piston 212 translates, the water that is located on the water side 240 is allowed to exit out of the exhaust valve and eventually to the fluid exhaust 106. As the master piston 212 continues to translate, the push linkage 244 engages the contact point 264 and 270 and rotates the toggle linkage 218. FIGS. 51-56 depict this position of operation. The toggle linkage 218 quickly snaps backward caused by the torsion spring 242 passes through its over-center state. As the toggle linkage 218 snaps backward, the toggle linkage 218 contacts the valve bridge 210 at points 268 and 270. The valve bridge 210 overcomes the valve detent and the exhaust valve 206 is then closed on the water side 240 and the intake valve 204 is closed on the mixing side 238. At the same time, the intake valve 204 is opened to the water side 240 and the exhaust valve is open to the mixing side 238. FIGS. 57-62 depict this position.

The device now enters an exhaust and mixing stage. Water is able to now enter the water side 240 through the intake valve 204. The cycle of operation begins again as described above for the intake stage. However, now as the extractor piston 254 translates, it expels the chemical additive pulled into the extractor piston cylinder 252 into the extractor piston 254 during its rightward translation (as shown in the Figures). The chemical additive is then expelled into the mixing chamber 238 where it mixes with the water present.

This mixture is then allowed to exhaust from the mixing chamber 238 through the exhaust valve 206 as the master piston 212 translates and compresses the volume of the mixing chamber 238. The mixture then can fluidly exhaust the device 100 through the fluid exhaust 106.

The operation of the device is repeated as described above for as long as the external source source is feeding water into the piston cylinder to allow it to continue hydraulically reciprocating.

While the foregoing description includes details and specific examples, it is to be understood that these have been included for purposes of explanation only, and are not to be interpreted as limitations of the present invention. It will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages of the present invention will be apparent to those skilled in the art from consideration of the specification and practice of the invention disclosed herein. The specification and examples should be considered exemplary.

The invention claimed is:

1. A hydraulic pump for adding a predetermined volume of additive fluid to a primary fluid, the pump comprising:

a main body having a first inlet for receiving a primary fluid, a second inlet for receiving an additive fluid, and an outlet for discharging a fluid, wherein the fluid comprises a fluid mixture of the primary fluid and the additive fluid or the primary fluid;

a piston sealingly mounted in the main body for reciprocating movement in response to flow of the primary fluid through the main body, the piston dividing the main body into a first and a second chamber;

a first valve for selectively transmitting the primary fluid from the inlet into the first and second chambers;

a second valve for selectively transmitting the fluid from the first and second chambers to the outlet;

an operable interconnection between the piston and the first and second valves comprising: a linkage mechanism and a spring attached thereto and responsive to the reciprocating movement of the piston for alternating the first and second valves between a first state, wherein the first valve transmits primary fluid from the first inlet to the first chamber and the second valve transmits fluid from the second chamber to the outlet, and a second state, wherein said first valve transmits primary fluid from the first inlet to the second chamber and the second valve transmits fluid from the first chamber to said outlet;

an extractor piston attached to the piston and sealingly mounted in a third chamber formed therein the main body;

a source of additive fluid communicably connected to the third chamber; and the extractor piston slidably mounted in the third chamber such that the extractor piston reciprocates in response to movement of the piston for pumping additive fluid from the source through the second inlet to the second chamber.

2. The hydraulic pump of claim 1, wherein the additive is a chemical additive.

3. The hydraulic pump of claim 1, wherein the primary fluid is water.

4. The hydraulic pump of claim 1, the first inlet comprising a threaded connection for coupling a primary fluid source thereto.

5. The hydraulic pump of claim 1, the second inlet comprising a threaded connection for coupling an additive fluid source thereto.

6. The hydraulic pump of claim 1, the outlet comprising a threaded connection for coupling a fluid conveyance apparatus thereto.

7. The hydraulic pump of claim 1, wherein the main body is constructed of plastic.

8. The hydraulic pump of claim 1, the operable interconnection further comprising:

the linkage mechanism comprising a push linkage and a pull linkage that are in turn coupled to a valve bridge that is operably interconnected with the first valve and the second valve.

9. The hydraulic pump of claim 1, wherein the source of the additive fluid is a container or cartridge configured to mate with the second inlet.

10. The hydraulic pump of claim 9, wherein the container or cartridge mates with the second inlet using a threaded connection.

11. A hydraulic pump for adding a predetermined volume of additive fluid to a primary fluid, the pump comprising:

a main body having a first inlet means for receiving a primary fluid, a second inlet means for receiving an additive fluid, and an outlet means for discharging a fluid, wherein the fluid comprises a fluid mixture of the primary fluid and the additive fluid or the primary fluid;

a piston sealingly mounted in the main body for reciprocating movement in response to flow of the primary fluid through the main body, the piston dividing the main body into a first and a second chamber;

a first valve means for selectively transmitting the primary fluid from the inlet into the first and second chambers;

a second valve means for selectively transmitting the fluid from the first and second chambers to the outlet;

means for operably interconnecting the piston and the first and second valve means comprising: a linkage means and a spring means attached thereto and responsive to the reciprocating movement of the piston for alternating the first and second valve means between a first state, wherein the first valve means transmits primary fluid from the first inlet means to the first chamber and the second valve means transmits fluid from the second chamber to the outlet means, and a second state, wherein said first valve means transmits primary fluid from the first inlet means to the second chamber and the second valve means transmits fluid from the first chamber to said outlet means;

an extractor means attached to the piston and sealingly mounted in a third chamber formed therein the main body;

a source of additive fluid communicably connected to the third chamber; and the extractor means slidably mounted in the third chamber such that the extractor means reciprocates in response to movement of the drive piston for pumping additive fluid from the source through the second inlet means to the second chamber.

12. The hydraulic pump of claim 11, wherein the additive is a chemical additive.

13. The hydraulic pump of claim 11, wherein the primary fluid is water.

14. The hydraulic pump of claim 11, the means for operably interconnecting further comprising:

the linkage means comprising a push means and a pull means for interacting with a valve bridge that is operably interconnected with the first valve and the second valve means.

15. The hydraulic pump of claim 11, wherein the source of the additive fluid is a container or cartridge configured to mate with the second inlet means using a threaded connection.

16. A hydraulic pump for adding a predetermined volume of additive fluid to a primary fluid, the pump comprising:

a main body having a first inlet for receiving a primary fluid, a second inlet for receiving an additive fluid from a cartridge, and an outlet for discharging a fluid, wherein the fluid comprises a fluid mixture of the primary fluid and the additive fluid or the primary fluid, the first inlet comprises a threaded connection for coupling a primary fluid source thereto, the second inlet comprises a threaded connection for coupling an additive fluid source thereto and the outlet comprises a threaded connection for coupling a fluid conveyance apparatus thereto;

a piston sealingly mounted in the main body for reciprocating movement in response to flow of the primary fluid through the main body, the piston dividing the main body into a first and a second chamber;

a first valve for selectively transmitting the primary fluid from the inlet into the first and second chambers;

a second valve for selectively transmitting the fluid from the first and second chambers to the outlet;

an operable interconnection between the piston and the first and second valves comprising: a linkage mechanism and a spring attached thereto and responsive to the reciprocating movement of the piston for alternating the first and second valves between a first state, the linkage mechanism comprising a push linkage and a pull linkage that are in turn coupled to a valve bridge that is operably interconnected with the first valve and the second valve, wherein the first valve transmits primary fluid from the first inlet to the first chamber and the second valve transmits fluid from the second chamber to the outlet, and a second state, wherein said first valve transmits primary fluid from the first inlet to the second chamber and the second valve transmits fluid from the first chamber to said outlet;

an extractor piston attached to the piston and sealingly mounted in a third chamber formed therein the main body;

a source of additive fluid communicably connected to the third chamber; and the extractor piston slidably mounted in the third chamber such that the extractor piston reciprocates in response to movement of the piston for pumping additive fluid from the source through the second inlet to the second chamber.

17. The hydraulic pump of claim 16, wherein the additive is a chemical additive.

18. The hydraulic pump of claim 16, wherein the primary fluid is water.

19. The hydraulic pump of claim 16, wherein the main body is constructed of plastic.

20. The hydraulic pump of claim 16, wherein the cartridge mates with the second inlet using a threaded connection.

* * * * *